(12) United States Patent
Gasper et al.

(10) Patent No.: US 10,179,628 B2
(45) Date of Patent: Jan. 15, 2019

(54) METHODS AND APPARATUS FOR FACILITATING WATERCRAFT PLANING

(71) Applicant: Malibu Boats, LLC, Merced, CA (US)

(72) Inventors: Daniel Lee Gasper, Atwater, CA (US); Timothy Michael Lopes, Merced, CA (US); Bryan Walter Munday, Merced, CA (US)

(73) Assignee: Malibu Boats, LLC, Merced, CA (US)

( * ) Notice: Subject to any disclaimer, the term of this patent is extended or adjusted under 35 U.S.C. 154(b) by 0 days.

(21) Appl. No.: 15/612,663

(22) Filed: Jun. 2, 2017

(65) Prior Publication Data

US 2017/0369126 A1 Dec. 28, 2017

Related U.S. Application Data

(63) Continuation of application No. 14/613,248, filed on Feb. 3, 2015, now Pat. No. 9,669,903.

(60) Provisional application No. 61/935,687, filed on Feb. 4, 2014.

(51) Int. Cl.
*B63B 1/28* (2006.01)
*B63B 1/24* (2006.01)

(52) U.S. Cl.
CPC .............. *B63B 1/285* (2013.01); *B63B 1/242* (2013.01)

(58) Field of Classification Search
CPC .. B63B 1/22; B63B 1/24; B63B 1/242; B63B 1/28; B63B 1/285
USPC ......................................... 114/280, 284, 285
See application file for complete search history.

(56) References Cited

U.S. PATENT DOCUMENTS

| | | |
|---|---|---|
| 667,482 A | 2/1901 | Albarda |
| 704,729 A | 7/1902 | Zerbe |
| 1,196,682 A | 8/1916 | Harriss |
| 1,264,320 A | 4/1918 | Metzler |
| 2,081,868 A | 5/1937 | Hampden |
| 2,199,333 A | 4/1940 | Dunklin |
| 2,663,276 A | 12/1953 | Ouellet |
| 2,807,228 A | 9/1957 | Vandre |
| 2,832,304 A | 4/1958 | Elyosius et al. |
| 2,890,673 A | 6/1959 | Chadwick, Jr. |

(Continued)

FOREIGN PATENT DOCUMENTS

| | | |
|---|---|---|
| CA | 2271332 | 2/2000 |
| CN | 2597328 | 1/2004 |

(Continued)

OTHER PUBLICATIONS

Ex Parte Reexamination of U.S. Pat. No. 9,260,161 (Control No. 90/013,819), Filed Sep. 26, 2016, Gasper et al.

(Continued)

*Primary Examiner* — Lars A Olson
(74) *Attorney, Agent, or Firm* — Knobbe, Martens, Olson & Bear, LLP

(57) ABSTRACT

A watercraft can include a foil configured for movement between an undeployed position and a first deployed position in which the foil raises the relative position of the watercraft relative to the water line as the watercraft moves forward through the water, thereby facilitating planing of the watercraft. The foil can be configured for movement to a second deployed position in which the foil lowers the relative position of the stern end of the watercraft as the watercraft moves forward through the water, thereby modifying the wake produced by the watercraft.

32 Claims, 11 Drawing Sheets

(56) References Cited

U.S. PATENT DOCUMENTS

| | | | |
|---|---|---|---|
| 2,994,290 | A | 8/1961 | Merchant, Sr. |
| 2,998,791 | A | 9/1961 | Light |
| 3,046,928 | A | 7/1962 | Sherrill |
| 3,062,167 | A | 11/1962 | Bennett |
| 3,079,885 | A | 3/1963 | Cooke |
| 3,094,960 | A | 6/1963 | Lang |
| 3,106,178 | A | 10/1963 | Cale |
| 3,111,103 | A | 11/1963 | Bennett |
| 3,159,134 | A | 12/1964 | Winnen |
| 3,200,782 | A | 8/1965 | Walden et al. |
| 3,247,820 | A | 4/1966 | White |
| 3,259,097 | A | 7/1966 | Veldhuizen et al. |
| 3,294,052 | A | 12/1966 | Jones |
| 3,327,671 | A | 6/1967 | Comins |
| 3,372,663 | A | 3/1968 | Bue |
| 3,391,667 | A | 7/1968 | Bue |
| 3,399,643 | A | 9/1968 | Bennett |
| 3,456,610 | A | 7/1969 | Beals |
| 3,577,948 | A | 5/1971 | Frey |
| 3,628,484 | A | 12/1971 | Banner |
| 3,628,486 | A | 12/1971 | Bennett |
| 3,628,487 | A | 12/1971 | Bennett |
| 3,650,310 | A | 3/1972 | Childress |
| 3,670,685 | A | 6/1972 | Milessa |
| 3,695,204 | A | 10/1972 | Bennett |
| 3,698,343 | A | 10/1972 | Boome |
| 3,760,759 | A | 9/1973 | Lang |
| 3,763,812 | A | 10/1973 | Rowe |
| 3,982,493 | A | 9/1976 | Cronin |
| 4,178,871 | A | 12/1979 | Hirsch |
| 4,232,626 | A | 11/1980 | Kern |
| 4,237,808 | A | 12/1980 | Doerffer |
| 4,261,278 | A | 4/1981 | Gaudin |
| 4,434,738 | A | 3/1984 | Barkemeyer |
| 4,577,580 | A | 3/1986 | Diffely, Sr. |
| 4,597,742 | A | 7/1986 | Finkl |
| 4,644,893 | A | 2/1987 | Zepp |
| 4,718,872 | A | 1/1988 | Olson et al. |
| 4,763,219 | A | 8/1988 | Nakamura |
| 4,776,295 | A | 10/1988 | Kline et al. |
| 4,854,259 | A | 8/1989 | Cluett |
| 4,895,093 | A | 1/1990 | Dalsbo |
| 4,910,419 | A | 3/1990 | Hayashi et al. |
| 4,915,048 | A | 4/1990 | Stanford |
| 4,967,682 | A | 11/1990 | O'Donnell |
| 5,041,040 | A | 8/1991 | Jones et al. |
| 5,058,520 | A | 10/1991 | Fahrney |
| 5,113,780 | A | 5/1992 | Bennett et al. |
| 5,142,473 | A | 8/1992 | Davis |
| 5,193,478 | A | 3/1993 | Mardikian |
| 5,224,436 | A | 7/1993 | Stricker |
| 5,235,926 | A | 8/1993 | Jones |
| 5,263,432 | A | 11/1993 | Davis |
| 5,315,951 | A | 5/1994 | Finkl |
| 5,359,956 | A | 11/1994 | Lee |
| 5,377,610 | A | 1/1995 | Goebel |
| 5,385,110 | A | 1/1995 | Bennet et al. |
| 5,445,100 | A | 8/1995 | Finkl |
| 5,474,012 | A | 12/1995 | Yamada et al. |
| 5,474,013 | A | 12/1995 | Wittmaier |
| 5,549,071 | A | 8/1996 | Pigeon et al. |
| 5,572,944 | A | 11/1996 | Slikkers et al. |
| 5,628,272 | A | 5/1997 | Thomas |
| 5,664,910 | A | 9/1997 | Lochtefeld et al. |
| 5,694,337 | A | 12/1997 | Macken |
| 5,787,835 | A | 8/1998 | Remnant |
| 5,860,384 | A * | 1/1999 | Castillo .................. B63B 39/061 114/280 |
| 5,860,766 | A | 1/1999 | Lochtefeld et al. |
| 5,881,666 | A | 3/1999 | Crews, Jr. |
| 5,911,190 | A | 6/1999 | Lochtefeld et al. |
| 6,006,689 | A | 12/1999 | Olofsson |
| 6,012,408 | A | 1/2000 | Castillo |
| 6,026,759 | A | 2/2000 | Hazelett et al. |
| 6,044,788 | A | 4/2000 | Larson et al. |
| 6,047,657 | A | 4/2000 | Cox |
| 6,105,527 | A | 8/2000 | Lochtefeld et al. |
| 6,138,601 | A | 10/2000 | Anderson et al. |
| 6,148,756 | A | 11/2000 | Pavlov et al. |
| 6,158,375 | A | 12/2000 | Stuart, Jr. |
| 6,167,830 | B1 | 1/2001 | Pilger |
| 6,213,044 | B1 | 4/2001 | Rodgers et al. |
| 6,234,099 | B1 | 5/2001 | Jessen et al. |
| 6,354,237 | B1 | 3/2002 | Gaynor et al. |
| 6,415,729 | B1 | 7/2002 | Nedderman, Jr. et al. |
| 6,427,616 | B1 | 8/2002 | Hagen |
| 6,520,104 | B1 | 2/2003 | Svensson |
| 6,523,489 | B2 | 2/2003 | Simard et al. |
| 6,523,490 | B1 | 2/2003 | Watkins |
| 6,603,402 | B2 | 8/2003 | Lentine et al. |
| 6,606,959 | B1 | 8/2003 | Shen |
| 6,745,715 | B1 | 6/2004 | Shen et al. |
| 6,782,839 | B1 | 8/2004 | Nozaki |
| 6,827,031 | B2 | 12/2004 | Aoyama |
| 6,874,441 | B2 | 4/2005 | Pigeon |
| 6,923,136 | B2 | 8/2005 | D'Alessandro |
| 6,935,263 | B1 | 8/2005 | Bandyopadhyay |
| 6,941,884 | B2 | 9/2005 | Moore |
| 6,953,002 | B2 | 10/2005 | Jessen et al. |
| 7,004,097 | B2 | 2/2006 | Zeromski |
| 7,007,621 | B1 | 3/2006 | Bootes |
| 7,018,252 | B2 | 3/2006 | Simard et al. |
| 7,063,031 | B2 | 6/2006 | Earl, Jr. et al. |
| 7,140,318 | B1 * | 11/2006 | Gasper .................. B63B 1/18 114/285 |
| 7,174,843 | B1 | 2/2007 | Tossavainen |
| 7,188,581 | B1 | 3/2007 | Davis et al. |
| 7,201,111 | B1 | 4/2007 | Burkett |
| 7,210,422 | B1 | 5/2007 | Hickok et al. |
| 7,216,601 | B1 | 5/2007 | Mann |
| 7,246,565 | B2 | 7/2007 | Snook et al. |
| 7,252,047 | B1 | 8/2007 | Baucom, Jr. |
| 7,252,074 | B2 | 8/2007 | Chapman et al. |
| 7,311,058 | B1 | 12/2007 | Brooks et al. |
| 7,318,389 | B2 | 1/2008 | Boning |
| 7,380,514 | B2 | 6/2008 | Loui et al. |
| 7,381,108 | B1 | 6/2008 | Salmon |
| 7,434,531 | B1 | 10/2008 | Zsido et al. |
| 7,467,596 | B2 | 12/2008 | Salmon |
| 7,497,748 | B2 | 3/2009 | Salmon |
| 7,617,026 | B2 | 11/2009 | Gee et al. |
| 7,641,525 | B2 | 1/2010 | Morvillo |
| 7,707,956 | B2 | 5/2010 | Moore |
| 7,780,490 | B2 | 8/2010 | Lundgren |
| 7,905,193 | B2 | 3/2011 | Beamer |
| 7,958,837 | B1 | 6/2011 | Fraleigh |
| 8,096,255 | B2 | 1/2012 | Morand et al. |
| 8,100,079 | B2 | 1/2012 | Buzzi |
| 8,191,493 | B2 | 6/2012 | Baywol |
| 8,201,514 | B2 | 6/2012 | Coles |
| 8,216,007 | B2 | 7/2012 | Moore |
| 8,251,006 | B2 | 8/2012 | Kalil |
| 8,261,682 | B1 | 9/2012 | DeVito |
| 8,327,790 | B2 | 12/2012 | Snow |
| 8,336,477 | B2 | 12/2012 | Walker |
| 8,387,551 | B2 | 3/2013 | Muller |
| 8,465,333 | B2 | 6/2013 | Sells |
| 8,468,964 | B2 | 6/2013 | Hoberman et al. |
| 8,480,445 | B2 | 7/2013 | Morvillo |
| 8,522,706 | B2 | 9/2013 | Larson et al. |
| 8,534,214 | B1 | 9/2013 | Gasper |
| 8,539,897 | B1 | 9/2013 | Gasper et al. |
| 8,578,873 | B2 | 11/2013 | Gasper et al. |
| 8,622,012 | B2 | 1/2014 | Olofsson |
| 8,631,753 | B2 | 1/2014 | Morvillo |
| 8,739,723 | B1 | 6/2014 | Murphy |
| 8,798,825 | B1 | 8/2014 | Hartman |
| 8,833,286 | B1 | 9/2014 | Sheedy et al. |
| 8,967,070 | B2 | 3/2015 | Kalil |
| 8,968,043 | B1 | 3/2015 | Murphy |
| 9,150,289 | B1 | 10/2015 | Brendel |
| 9,156,372 | B1 | 10/2015 | Guglielmo et al. |
| 9,199,695 | B2 | 12/2015 | Gasper et al. |
| 9,254,896 | B2 | 2/2016 | Bertalan et al. |

(56) References Cited

U.S. PATENT DOCUMENTS

| | | | |
|---|---|---|---|
| 9,260,161 | B2 | 2/2016 | Gasper et al. |
| 9,272,762 | B1 | 3/2016 | Murphy |
| 9,315,235 | B1 | 4/2016 | Wood |
| 9,315,236 | B2 | 4/2016 | Gasper |
| 9,334,022 | B2 | 5/2016 | Gasper et al. |
| 9,540,074 | B1 | 1/2017 | Pigeon |
| 9,573,655 | B1 | 2/2017 | Pigeon |
| 9,580,147 | B2 | 2/2017 | Gasper et al. |
| 9,592,890 | B2 | 3/2017 | Christensen |
| D783,021 | S | 4/2017 | Peel |
| 9,669,903 | B2 * | 6/2017 | Gasper .................... B63B 1/285 |
| 9,694,873 | B2 | 7/2017 | Gasper et al. |
| 9,891,620 | B2 | 2/2018 | Green et al. |
| 9,914,504 | B2 | 3/2018 | Gasper et al. |
| 2004/0261684 | A1 | 12/2004 | Pigeon |
| 2005/0124234 | A1 | 7/2005 | Sells et al. |
| 2005/0155540 | A1 | 7/2005 | Moore |
| 2006/0054067 | A1 | 3/2006 | Hoberman et al. |
| 2006/0217011 | A1 | 9/2006 | Morvillo |
| 2007/0078575 | A1 | 4/2007 | Wilson et al. |
| 2007/0125287 | A1 | 6/2007 | Walker |
| 2007/0137550 | A1 | 6/2007 | Davis et al. |
| 2007/0202757 | A1 | 8/2007 | Moore |
| 2008/0257245 | A1 | 10/2008 | Stella |
| 2008/0271660 | A1 | 11/2008 | Zsido et al. |
| 2008/0281478 | A1 | 11/2008 | Gee et al. |
| 2009/0165694 | A1 | 7/2009 | Beamer |
| 2010/0101475 | A1 | 4/2010 | Mueller |
| 2010/0121493 | A1 | 5/2010 | Christensen et al. |
| 2010/0251952 | A1 | 10/2010 | Baywol |
| 2011/0017115 | A1 | 1/2011 | Olofsson |
| 2011/0126751 | A1 | 6/2011 | Muller |
| 2011/0320072 | A1 | 12/2011 | Morvillo |
| 2012/0079977 | A1 | 4/2012 | Gai |
| 2013/0000542 | A1 | 1/2013 | Muller |
| 2013/0145978 | A1 | 6/2013 | Viviani et al. |
| 2014/0026799 | A1 | 1/2014 | Kalil |
| 2014/0137787 | A1 | 5/2014 | Gasper et al. |
| 2015/0066249 | A1 | 3/2015 | Bieback et al. |

FOREIGN PATENT DOCUMENTS

| | | |
|---|---|---|
| DE | 26 34 573 | 2/1978 |
| DE | 101 59 040 | 9/2002 |
| EP | 1 435 325 | 7/2004 |
| EP | 1 058 645 | 10/2004 |
| FR | 2 556 312 | 6/1985 |
| GB | 332315 | 7/1930 |
| NR | 86945 | 2/1956 |
| SU | 975490 | 11/1982 |
| WO | WO 93/00258 | 1/1993 |
| WO | WO 96/20105 | 7/1996 |
| WO | WO 99/55577 | 11/1999 |
| WO | WO 2005/118384 | 12/2005 |
| WO | WO 2006/058232 | 6/2006 |
| WO | WO 2007/072185 | 6/2007 |
| WO | WO 2009/113923 | 9/2009 |
| WO | WO 2011/099931 | 8/2011 |
| WO | WO 2013/040576 | 3/2013 |
| WO | WO 2013/071148 | 5/2013 |

OTHER PUBLICATIONS

MasterCraft Surf Tab—Screenshots taken from video uploaded on May 26, 2010 at http://www.youtube.com/watch?v=b1Q_MLRO31M.
Tige Convex VX—Screenshots taken from video uploaded on Oct. 10, 2012 at http://www.youtube.com/watch?v=jx5QXC-dU9w.
Centurion Wake Plate—Website dated Aug. 27, 2011—http://www.centurionboats.com/features-and-options/adjustable-wake-plate.html.
Nautique Surf System—Released Jan. 3, 2013—Website printout from http://www.nautique.com/models/nautique-surf-system.
Letter from Edmund J. Haughey of Fitzpatrick, Cella, Harper & Scinto, dated Feb. 3, 2016.
"Debut of new Sanger Surf Series," Wake World forum having postings between Oct. 4, 2008 and Feb. 9, 2009, webpage archive of http://www.wakeworld.com/forum/showthread.php?t=632602 dated May 30, 2012, 171 pages.
Screenshots taken from video titled "Surf Sanger," uploaded on Apr. 30, 2008 at https://www.youtube.com/watch?v=WcVIZZ7QZus.
Email from Edmund J. Haughey of of Fitzpatrick, Cella, Harper & Scinto, dated Feb. 11, 2016.
Humphree Operator's Manual, dated 2009.
Humphree Installation Manual, dated 2009.
"Malibu Makes Boating Easier and More Fun With MaliView," dated Sep. 4, 2008.
Ski Locker—Trim the Waves to Suit Your Personality, Trailer BOATS (as reprinted at http://www.switchbladewake.com/switchblade.pdf), Jul. 2005.
International Search Report dated Dec. 6, 2012 for PCT/US2012/055788.
International Search Report dated Jan. 25, 2013 for PCT/US2012/064504.
Volvo Penta—QL Boat Trim System Brochure—The Declaration of David Kennedy alleges that this brochure became publicly available prior to 2010.
Volvo Penta—QL Boat Trim System User & Installation Instructions—The Declaration of David Kennedy alleges that these instructions became publicly available prior to 2010.
Declaration of David Kennedy, dated Dec. 13, 2013, in *Malibu Boats, LLC* v. *Nautique Boat Co.*, Case No. 3:13-cv-00656, in the United States District Court for the Eastern District of Tennessee.
Malibu Wedge, Performance Wakeboard Report, 1997, vol. 1, issue 3, p. 43, Performance Report Magazines, Inc., Hood River, Oregon.
Malibu-Response, Performance Wakeboard Report, 1997 vol. 1, issue 1, pp. 16-17, Performance Report Magazines, Inc., Hood River, Oregon.
First Look Nautique Surf System Wakeworld in 3 pages, Author: David Williams, Jan. 16, 2013.
Lenco Marine Inc., Electric Trim Tab Kits in 2 pages, Oct. 2007.
QL—Quality Line product news: Trim system with new technology, dated Aug. 16, 2004.
Nautique Launches the Nautique Surf System—Press Release, dated Jan. 3, 2013.
Luke, Surf Expo WBM's Surf Expo-Booth View: MasterCraft, dated Sep. 10, 2009.
Luke, Wakeboarding Mastercraft X-25 2011, Wakeboard Boat Review, Feb. 16, 2011.
Luke, Wakeboarding Mastercraft X-2 2011, Wakeboard Boat Review, Feb. 16, 2011.
Luke, Wakeboarding Zane Schwenk Shreds MasterCrafts New Surf Tabs, Sep. 17, 2009.
Video titled "MasterCraft Rewind 2010—The BIG Review", allegedly uploaded on Dec. 30, 2009 at https://www.youtube.com/watch?v=85CoNjFc-wY.
Machine transcription (using a method from http://www.labnol.org/internet/transcribe-video-to-text/28914/) taken from a video titled "MasterCraft Rewind 2010—The BIG Review", allegedly uploaded on Dec. 30, 2009 at https://www.youtube.com/watch?v=85CoNjFc-wY.
Video titled "MasterCraft Rewind 2010—Surf Tab and Tower Camera Review", allegedly uploaded on Dec. 30, 2009 at https://www.youtube.com/watch?v=UVRra3sMV7A.
Machine transcription (using a method from http://www.labnol.org/internet/transcribe-video-to-text/28914/) taken from a video titled "MasterCraft Rewind 2010—Surf Tab and Tower Camera Review", allegedly uploaded on Dec. 30, 2009 at https://www.youtube.com/watch?v=UVRra3sMV7A.
Video titled "MasterCraft CSX 265 Review", allegedly uploaded on Nov. 11, 2009 at https://www.youtube.com/watch?v=—N30QPJtfQ.
Machine transcription (using a method from http://www.labnol.org/internet/transcribe-video-to-text/28914/) taken from a video titled "MasterCraft CSX 265 Review", allegedly uploaded on Nov. 11, 2009 at https://www.youtube.com/watch?v=--N30QPJtfQ.

(56) References Cited

OTHER PUBLICATIONS

Video titled "Z3 Wakesurf Side to Side in Seconds", allegedly uploaded on Jul. 8, 2012 at https://www.youtube.com/watch?v=jVJIVomFjT0.
Machine transcription (using a method from http://www.labnol.org/internet/transcribe-video-to-text/28914/) taken from a video titled "Z3 Wakesurf Side to Side in Seconds", allegedly uploaded on Jul. 8, 2012 at https://www.youtube.com/watch?v=jVJIVomFjT0.
Video titled "The All-New Nautique Surf System", allegedly uploaded on Jan. 3, 2013 at https://www.youtube.com/watch?v=gtaySYhmAdA.
Machine transcription (using a method from http://www.labnol.org/internet/transcribe-video-to-text/28914/) taken from a video titled "The All-New Nautique Surf System", allegedly uploaded on Jan. 3, 2013 at https://www.youtube.com/watch?v=gtaySYhmAdA.
Video titled "Nautique Surf System How-to-Video", allegedly uploaded on Jan. 3, 2013 at https://www.youtube.com/watch?v=GnKfEtMskao.
Machine transcription (using a method from http://www.labnol.org/internet/transcribe-video-to-text/28914/) taken from a video titled "Nautique Surf System How-to-Video", allegedly uploaded on Jan. 3, 2013 at https://www.youtube.com/watch?v=GnKfEtMskao.
MasterCraft Boat Company Recipient of NMMA Innovation Award, Feb. 2010.
MasterCraft Reveals New Innovations for 2010, Aug. 2009.
MasterCraft X-Series Models HV700 and HV450 Owner's Manual in 58 pages, Jul. 24, 2012.
Medallion Instrumentation Systems 2010 MasterCraft Viper System in 41 pages, alleged to have a date of prior to Sep. 16, 2010.
Medallion Instrumentation Systems MasterCraft University Instrumentation Training Part 1, Feb. 2012.
Nautique Surf System The new standard in Wakesurfing in 3 pages, Jan. 16, 2013.
Sanger Boats V237 2008 Wakeboarding Magazine in 4 pages, Jan. 1, 2008.
Video titled "2011 MasterCraft X-25", allegedly uploaded on Mar. 15, 2011 at https://www.youtube.com/watch?v=CpPRDrLznoQ.
Screenshot taken early in a video titled "2011 MasterCraft X-25", allegedly uploaded on Mar. 15, 2011 at https://www.youtube.com/watch?v=CpPRDrLznoQ.
Video titled "MasterCraft Rewind 2009—Day in the. Life of the CSX 265", allegedly uploaded on Dec. 24, 2008 at https://www.youtube.com/watch?v=nr5xXu5fA54.
Screenshot taken early in a video titled "MasterCraft Rewind 2009—Day in the Life of the CSX 265", allegedly uploaded on Dec. 24, 2008 at https://www.youtube.com/watch?v=nr5xXu5fA54.
Video titled "The History of Wake Surfing", allegedly uploaded on Sep. 27, 2012 at https://www.youtube.com/watch?v=KWYZf3A7aas.
Screenshot taken early in a video titled "The History of Wake Surfing", allegedly uploaded on Sep. 27, 2012 at https://www.youtube.com/watch?v=KWYZf3A7aas.
Teakgate Modifications & Accessories (p. 1), TheMalibuCrew.com in 13 pages, Oct. 2012.
Teakgate Modifications & Accessories (p. 2), TheMalibuCrew.com in 11 pages, Oct. 2012.
Teakgate Modifications & Accessories (p. 3), TheMalibuCrew.com in 3 pages, Oct. 2012 to Nov. 2012.
Teakgate Modifications & Accessories (p. 4), TheMalibuCrew.com in 5 pages, Nov. 2012 to Mar. 2013.
Video titled "2008 Surfing Sanger 237 Edition", allegedly uploaded on Sep. 17, 2008 at https://www.youtube.com/watch?v=VedGGGD79bM.
Transcription taken from a video titled "2008 Surfing Sanger 237 Edition", allegedly uploaded on Sep. 17, 2008 at https://www.youtube.com/watch?v=VedGGGD79bM.
Video titled "A ride on the wakesurf board", allegedly uploaded on Oct. 15, 2012 at https://www.youtube.com/watch?v=3ru47pbUgyo.
Transcription taken from a video titled "A ride on the wakesurf board", allegedly uploaded on Oct. 15, 2012 at https://www.youtube.com/watch?v=3ru47pbUgyo.

Video titled "Malibu Sunsetter First Crossover", allegedly uploaded on Oct. 14, 2012 at https://www.youtube.com/watch?v=5Wou4sWdTXk.
Transcription taken from a video titled "Malibu Sunsetter First Crossover", allegedly uploaded on Oct. 14, 2012 at https://www.youtube.com/watch?v=5Wou4sWdTXk.
Video titled "Malibu Sunsetter with Teakgate—first water test", allegedly uploaded on Oct. 14, 2012 at https://www.youtube.com/watch?v=u3Bx5k7dOD8.
Transcription taken from a video titled "Malibu Sunsetter with Teakgate—first water test", allegedly uploaded on Oct. 14, 2012 at https://www.youtube.com/watch?v=u3Bx5k7dOD8.
Video titled "Malibu Sunsetter with 'Teakgate'", allegedly uploaded on Oct. 13, 2012 at https://www.youtube.com/watch?v=pUwoFd4wOTs.
Transcription taken from a video titled "Malibu Sunsetter with 'Teakgate'", allegedly uploaded on Oct. 13, 2012 at https://www.youtube.com/watch?v=pUwoFd4wOTs.
Video titled "MasterCraft X10 Featuring Surf Tabs", allegedly uploaded on Feb. 9, 2013 at https://www.youtube.com/watch?v=nVddaDkKR5k.
Transcription taken from a video titled "MasterCraft X10 Featuring Surf Tabs", allegedly uploaded on Feb. 9, 2013 at https://www.youtube.com/watch?v=nVddaDkKR5k.
Video titled "No need surf gates . . . Only a Mastercraft X10", allegedly uploaded on Nov. 23, 2012 at https://www.youtube.com/watch?v=oltkqqKwEes.
Transcription taken from a video titled "No need surf gates . . . Only a Mastercraft X10", allegedly uploaded on Nov. 23, 2012 at https://www.youtube.com/watch?v=oltkqqKwEes.
Video titled "Riding the Teakgate Wave", allegedly uploaded on Oct. 15, 2012 at https://www.youtube.com/watch?v=VgH-WvdWdSo.
Transcription taken from a video titled "Riding the Teakgate Wave", allegedly uploaded on Oct. 15, 2012 at https://www.youtube.com/watch?v=VgH-WvdWdSo.
Video titled "Steve wake surfing both sides of the wake", allegedly uploaded on Aug. 12, 2007 at https://www.youtube.com/watch?v=TAjUt6Kh-Xw.
Transcription taken from a video titled "Steve wake surfing both sides of the wake", allegedly uploaded on Aug. 12, 2007 at https://www.youtube.com/watch?v=TAjUt6Kh-Xw.
Video titled "Teakgate Dual Gate Test", allegedly uploaded on Nov. 12, 2012 at https://www.youtube.com/watch?v=c6nEgA099fs.
Transcription taken from a video titled "Teakgate Dual Gate Test", allegedly uploaded on Nov. 12, 2012 at https://www.youtube.com/watch?v=c6nEgA099fs.
Video titled "Teakgate Testing", allegedly uploaded on Nov. 12, 2012 at https://www.youtube.com/watch?v=H5tOiz9SdaQ.
Transcription taken fro m a video titled "Teakgate Testing", allegedly uploaded on Nov. 12, 2012 at https://www.youtube.com/watch?v=H5tOiz9SdaQ.
Video titled "Wakesurfing the Sanger 237", allegedly uploaded on Apr. 29, 2008 at https://www.youtube.com/watch?v=nG0YH8fwCmM.
Transcription taken from a video titled "Wakesurfing the Sanger 237", allegedly uploaded on Apr. 29, 2008 at https://www.youtube.com/watch?v=nG0YH8fwCmM.
Video titled "Wakesurfing Crossover behind a 1987 Sunsetter", allegedly uploaded on Oct. 15, 2012 at https://www.youtube.com/watch?v=yCGsKoyLbYs.
Transcription taken from a video titled "Wakesurfing Crossover behind a 1987 Sunsetter", allegedly uploaded on Oct. 15, 2012 at https://www.youtube.com/watch?v=yCGsKoyLbYs.
Volvo Penta, QL Boat Trim System & Automatic Boat Trim Option in 4 pages, 2008.
Volvo Penta, QL Boat Trim System Brochure in 4 pages, 2007.
Volvo Penta, QL Boat Trim System Marine Accessories, www.qlmarine.com in 2 pages, 2004.
WakeWorld Forum Showthread, Is the Razor Blade the Switch Blade for Surfing in 14 pages, forum posts dated Feb. 8, 2008 and earlier.
WakeWorld MasterCraft Reveals New Innovations for 2010 in 3 pages, Aug. 24, 2009.

(56) References Cited

OTHER PUBLICATIONS

2010 Mastercraft Owner's Manual.
2011 Mastercraft Owner's Manual (Part 1—covering pp. #i-#4-33).
2011 Mastercraft Owner's Manual (Part 2—covering pp. #5-1-#24-4).
2012 Mastercraft Owner's Manual.
2013 Mastercraft Owner's Manual (Part 1—covering pp. #i-#2-45).
2013 Mastercraft Owner's Manual (Part 2—covering pp. #3-1-#6-18).
New QL Boat Trim System—Always Perfect Trim, dated Jul. 2007.
Malibu 2009 Owner's Manual.
MasterCraft Reveals 2010 Innovations, dated Sep. 3, 2009.
Machine transcription (using a method from http://www.labnol.org/internet/transcribe-video-to-text/28914/) taken from a video titled "Zane Schwenk—MasterCraft Surf Tabs", allegedly uploaded on May 26, 2010 at http://www.youtube.com/watch?v=b1Q_MLRO31M.
Videos uploaded on Dec. 13, 2016: MCFT0071469—https://youtu.be/4s1ZWLWoRiM MCFT0071470—https://youtu.be/UV-_8qhQ7p0 MCFT0071471—https://youtu.be/6YcERDOWpq0 MCFT0071472—https://youtu.be/LghlFtztrpE MCFT0071473—https://youtu.be/uw7Vb0_6Jjc MCFT0071474—https://youtu.be/wuG85gQBJqg MCFT0071475—https://youtu.be/3oo1JP1sZY8 MCFT0071476—https://youtu.be/O0E1yKTBABU MCFT0071477—https://youtu.be/tDSGnbMBi8E MCFT0071478—https://youtu.be/vzLNdRnzrrE MCFT0071479—https://youtu.be/-6v9ThC3bgQ MCFT0071725—https://youtu.be/wh2Qxcofft4 One or more of these videos were referenced in MasterCraft's Invalidity Contentions dated May 12, 2016 and Nov. 14, 2016.
Nautique Surf System (2 Pages), dated Jan. 3, 2013, http://www.nautique.com/blog/index/nautique-surf-system.
Video titled "X-2 Surfing 2010," allegedly uploaded on Aug. 31, 2010 at https://www.youtube.com/watch?v=1FbuXfaWFwU.
Screenshot taken early in a video titled "X-2 Surfing 2010," allegedly uploaded on Aug. 31, 2010 at https://www.youtube.com/watch?v=1FbuXfaWFwU.
Castle Bravo—Power Trim Tabs, dated May 11, 2011, http://mhkaufman.blogspot.com/2011/05/power-trim-tabs.html.
Wake Plates?—Wakeboarder.com Forum, Posts dated Mar. 23, 2005 to Mar. 24, 2005, http://forums.wakeboarder.com/viewtopic.php?t=40149&sid.
Tips for Proper Boat Weighting, dated Sep. 28, 2012, https://www.wakeutah.com/2012/09/28/tips-for-proper-boat-weighting/.

\* cited by examiner

METHODS AND APPARATUS FOR FACILITATING WATERCRAFT PLANING

CROSS-REFERENCE TO RELATED APPLICATIONS

This application is a continuation of U.S. patent application Ser. No. 14/613,248, filed Feb. 3, 2015, and titled METHODS AND APPARATUS FOR FACILITATING WATERCRAFT PLANING, which claims the benefit of U.S. Provisional Patent Application No. 61/935,687, filed Feb. 4, 2014, and titled METHODS AND APPARATUS FOR FACILITATING WATERCRAFT PLANING, and the entirety of each of the above-identified applications is hereby incorporated by reference.

BACKGROUND

Field of the Disclosure

This disclosure relates, in general, to methods and apparatus for facilitating planing of a watercraft, and more particularly to a water foil that is movable to a position that is configured to provide a lifting force to a boat when the boat moves forward through water.

Description of the Related Art

In some situations, it can be desirable for a watercraft to plane quickly. For example, for water-sport boats towing a rider (e.g., a water skier, wake boarder, or wake surfer), it can be easier for the rider to get up if the boat quickly reaches planing speed.

SUMMARY OF CERTAIN EMBODIMENTS

Embodiments described herein have several features, no single one of which is essential or solely responsible for their desirable attributes. Without limiting the scope of the claims, some examples of the advantageous features will be summarized.

Various embodiments disclosed herein relate to a watercraft such as an inboard water-sport boat that can include a hull having a transom, and a foil coupled to the hull and movable between an undeployed position, a first deployed position, and a second deployed position. The foil can be configured to produce a lifting force when in the first deployed position as the hull moves through water. The foil can be configured to produce a downward force when in the second deployed position as the hull moves through water. In some embodiments, at least a portion of the foil is disposed above a bottom edge of the transom when in the undeployed position. In some embodiments, the foil can be oriented substantially vertically when in the undeployed position.

The boat can include one or more actuators configured to move the foil between the undeployed position, the first deployed position, and the second deployed position. The boat can include a user interface configured to receive user input, and the one or more actuators can be configured to move the foil in response to the user input received by the user interface. The boat can be configured such that the one or more actuators automatically move the foil from the first deployed position to the undeployed position or the second deployed position when the boat is planing. The boat can be configured such that the one or more actuators automatically move the foil from the first deployed position to the second deployed position when the boat is planing. The boat can be configured such that the one or more actuators automatically move the foil from the first deployed position to the undeployed position or the second deployed position when the boat is moving above a pre-determined speed. The boat can be configured such that the one or more actuators automatically move the foil from the first deployed position to the second deployed position when the boat is moving above a pre-determined speed. The boat can include a user interface configured to output a notification to a user when the foil is in the first deployed position.

The foil can rotate across an angle greater than 90 degrees between the undeployed position and the first deployed position. The foil can rotate across an angle of less than 90 degrees between the undeployed position and the second deployed position.

The boat can include one or more arms coupled to the foil, and the one or more arms can be movable for positioning the foil at the undeployed position, the first deployed position, and the second deployed position. The foil can be coupled to the one or more arms at an angle that offset from perpendicular by between about 5 degrees and about 40 degrees. The foil can be coupled to the one or more arms at an angle that offset from perpendicular by between about 10 degrees and about 30 degrees.

Various embodiments disclosed herein can relate to a system for facilitating planing of a watercraft traveling through water. The system can include a foil movable between an undeployed position and a first deployed position. The foil can be positioned substantially vertically when in the undeployed position. The first deployed position of the foil can be configured to divert water generally downward as the watercraft travels forward through water to produce a lifting force. The boat can include a user interface configured to receive user input and one or more actuators configured to move the foil in response to input received by the user interface.

The system can include one or more arms having first ends and second ends. The first ends of the one or more arms can be coupled to the foil and the second ends can be coupled to the one or more actuators. The one or more arms can be configured to pivot about a pivot coupling that is between the first and second ends of the one or more arms. In some embodiments, the system can include one or more arms coupled to the foil, and the one or more arms can be movable for positioning the foil at the undeployed position and the first deployed position, and the foil can be coupled to the one or more arms at an angle that offset from perpendicular by between about 10 degrees and about 30 degrees, although values outside of this range can also be used as described herein (such as in connection with angle 142).

The system can include a mounting member configured to couple the foil to the transom of the watercraft. The system can include a controller configured to operate the one or more actuators in response to input received by the user interface.

In some embodiments, at least a portion of the foil can be configured to be positioned out of the water when in the undeployed position. Substantially the entire foil can be configured to be positioned out of the water when in the undeployed position.

The foil can be movable to a plurality of interim positioned configured to provide differing amounts of lifting force. The foil can be movable to a second deployed position that is configured to divert water generally upward as the watercraft travels forward through water to produce a downward force. The system can be configured to move the foil to the second deployed position after the watercraft is planing. The system can be configured to move the foil to the second deployed position when the watercraft is moving faster than a predetermined speed. The system can be configured to move the foil to the undeployed position after the watercraft is planing. The system can be configured to move the foil to the undeployed position when the watercraft is moving faster than a predetermined speed.

The system can be used in combination with a watercraft, and the foil can be positioned at the stern of the watercraft at a central location that is about equidistant between the sides of the watercraft. A longitudinal axis of the watercraft can intersect the foil. The system can be used in combination with a watercraft having a transom, and at least a portion of the foil can be disposed above a bottom edge of the transom when in the undeployed position. The user interface can be configured to output a notification when the foil is at the first deployed position.

BRIEF DESCRIPTION OF THE DRAWINGS

The following drawings and the associated descriptions are provided to illustrate example embodiments of the present disclosure and do not limit the scope of the claims.

DETAILED DESCRIPTION OF CERTAIN EMBODIMENTS

Various example embodiments are disclosed herein. The embodiments illustrated and described herein are disclosed by way of example, and the inventions are not limited to the particular features of the example embodiments.

It can be desirable for a watercraft to quickly transition from a stop to a planing speed. When planing, a watercraft generally travels faster than the hull speed of the watercraft. When planing, a watercraft can partially lift out of the water and travel generally along the surface of the water rather than plowing through the water. A sport boat (e.g., an inboard water-sport boat) used for towing a rider (e.g., a water skier, wake boarder, or wake surfer) can weigh several thousand pounds, especially during use when the boat can carry several passengers, gear, and ballast such as water ballast (e.g., for increasing the wake size, such as for wake boarding). The weight of the boat can impede the boat from planing quickly. When the sport boat does not plane quickly, it can be more difficult for the rider to get up, especially for beginner riders.

Various embodiments disclosed herein relate to boats (or other watercraft) that have a plane assist system, which can be configured to provide a lifting force to help the boat plane quickly. The plane assist system can include a foil that can be moved between multiple positions. The foil can be positioned to divert water generally downward as the boat moves forward. Diverting the water generally downward can produce a lifting force on the foil, which can lift the stern of the boat. In some embodiments, the foil can have a shape that is configured to produce a pressure differential that results in lift (e.g., similar to an airplane wing) as the foil moves through water. In some embodiments, the foil can be moved to a position in which the foil produces a downward force, for example, by diverting water upward or by the shape of the foil (e.g., similar to an airplane wing).

Figure 1:
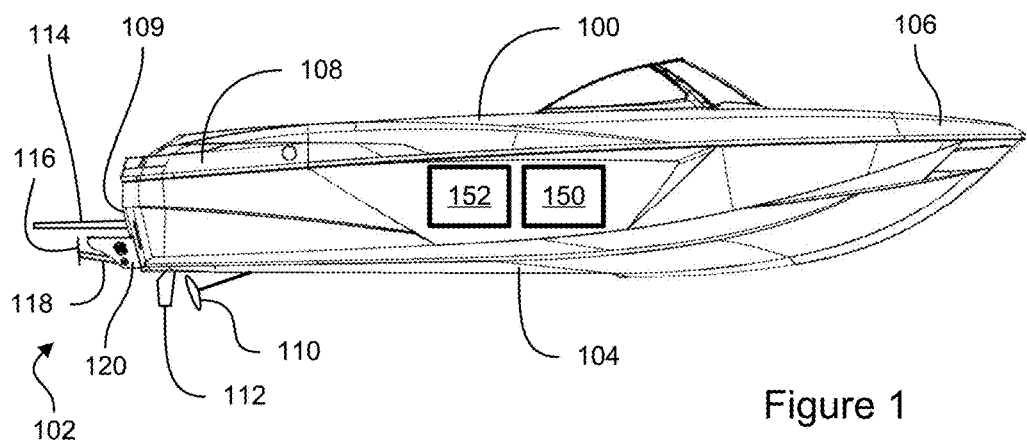
FIG. 1 shows an example embodiment of a boat having a plane assist system in an undeployed configuration.

FIG. 1 shows an example embodiment of a boat 100 that includes a plane assist system 102 configured to facilitate planing of the boat 100. Although various embodiments are disclosed in connection with inboard sport boats (e.g., for water skiing, wake surfing, and/or wakeboarding), various other types of boats and other types of watercraft can also include a plane assist system 102 as well as other features described herein. The boat 100 can include a hull 104, a bow 106, and a stern 108. The boat 100 can include a propeller 110 configured to propel the boat forward (e.g., by driving water rearward to create forward thrust). The boat 100 can include a rudder 112 for steering the boat 100. The rudder 112 can be disposed near the propeller 110 such that water driven rearward by the propeller 110 contacts the rudder 112 to facilitate steering of the boat 100. The boat 110 can include a swim deck 114, for example, extending rearward from the stern 108 of the boat 100. The boat 100 can include various other features, which are not shown in FIG. 1. For example, the boat 100 can include a ballast system, which can be configured to add and remove water ballast to and from one or more ballast containers on the boat 100. The boat can include an engine, which can be configured to drive the propeller 110 in order to move the boat 100 through water. The boat 100 can be an inboard boat in which the hull 104 houses the engine. The boat 100 can include a tow tower, which can include a tow connector suspended over the hull 104 and configured to have a tow cable attached thereto. The boat 100 can include one or more stabilizing fins disposed on an underside of the hull 104.

The plane assist system 102 can be positioned at the stern 108 of the boat 100, for example below the swim deck 114. The plane assist system 102 can include a foil 116, which can be, for example, configured to redirect water to adjust the position of the boat 100. The foil 116 can be movably mounted at the stern 108 of the boat 100 (e.g., on a transom 109 of the boat 100). One or more positioning elements (e.g., arms 118) can be coupled to the foil 116 and can be used to position the foil 116. A mounting member 120 can couple the foil 116 and/or the one or more arms 118 to the boat 100 (e.g., to the transom 109 of the boat 100). In some embodiments, the mounting member 120 can be configured to cover at least some elements of the plane assist system 102 (e.g., when not deployed).

Figure 5:
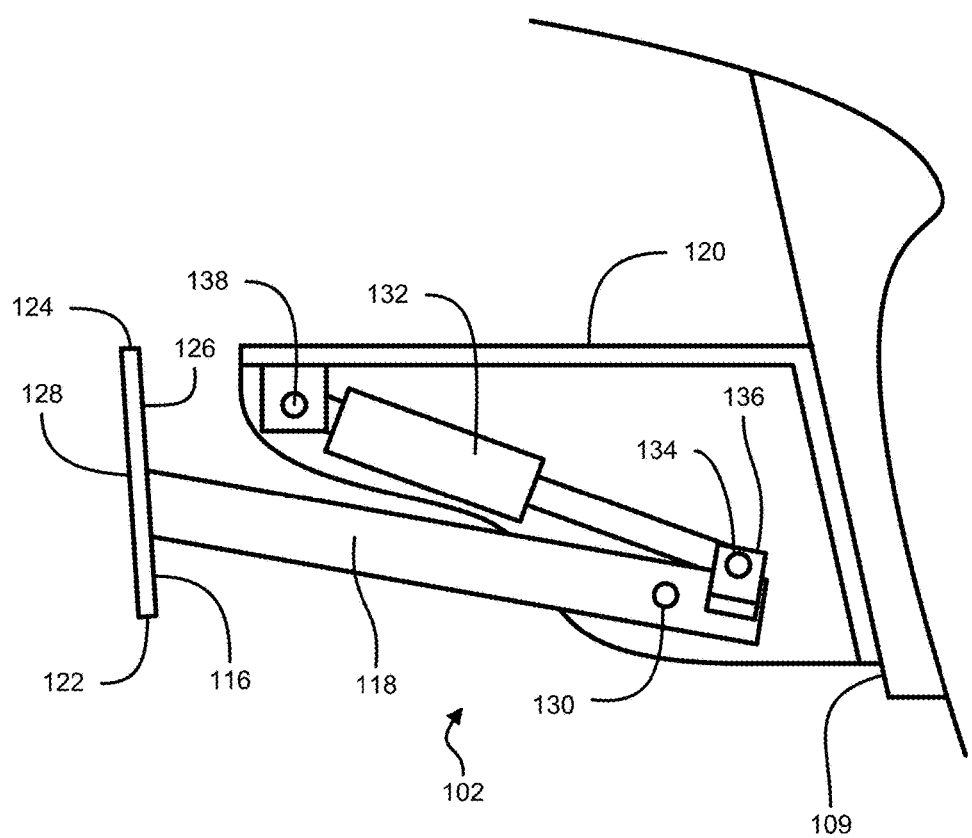
FIG. 5 shows an example embodiment of a plane assist system in an undeployed configuration.

FIG. 1 shows the plane assist system 102 in an undeployed (e.g., retracted, lifted, or stowed) configuration. In some embodiments, the plane assist system 102 does not produce substantial lift or downward pull on the stern 108 of the boat 100 when in the undeployed configuration. In some embodiment, when in the undeployed configuration, the foil 116 can be positioned at a location that is configured to be out of the water (e.g., when the boat is not moving), although in some embodiments, the foil 116 can be in the water when in the undeployed configuration (e.g., the undeployed foil 116 can have an orientation and/or position that does not cause substantial lift or downward pull on the stern 108 of the boat 100 as the boat 100 travels through water). In some implementations, the foil 116 can be generally vertical when in the undeployed position. The foil 116 can have an upright undeployed position. In some embodiments, the foil 116 can have an undeployed position that varies from absolute vertical by about 15 degrees, by about 10 degrees, by about 5 degrees, or less. In some embodiments, the foil 116 can be disposed above a bottom edge of the transom 109 when in the undeployed position. As can be seen in FIGS. 1 and 5, in some embodiments, the entire foil 116 can be disposed above the bottom edge of the transom when in the undeployed position. In some embodiments, at least a portion of the foil is disposed above the bottom edge of the transom when in the undeployed position. In some embodiments, at least about 95%, at least about 95%, at least about 85%, at least about 75%, at least about 50%, at least about 25%, or more of the foil can be disposed above the bottom edge of the transom when in the undeployed position. In some embodiments, when the boat 100 moves forward through water, the water can flow along the bottom and lower sides of the hull 104. The foil 116 can be positioned behind the transom 109 when in the undeployed position such that the foil 116 does not significantly divert the water flowing along the bottom of the hull 104 and past the transom 109 as the hull 104 moves forward.

Figure 2:
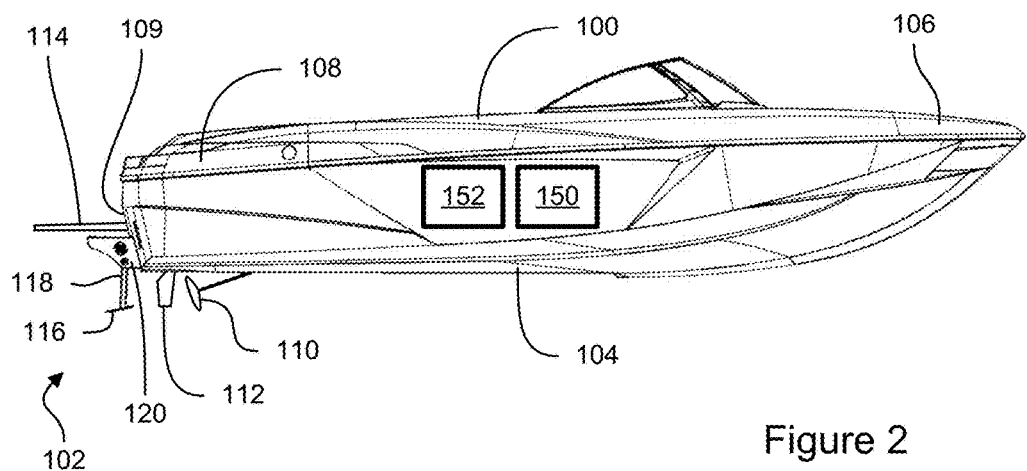
FIG. 2 shows an example embodiment of a boat having a plane assist system in a first deployed configuration that is configured to provide a lifting force.

FIG. 2 shows the plane assist system 102 in a first deployed configuration, which can be configured to lift the boat 100 (e.g., the stern 108) as the boat 100 travels forward through the water. For example, when in a first deployed position, the foil 116 can divert water downward, which can result in an upward force on the foil 116 that lifts the stern 108 of the boat 100. The water flowing along the bottom of the hull 104 can hit the foil 116 (e.g., as the water flows past the transom 109), and the foil can divert the flow of water generally downward. Lifting the stern 108 of the boat 100 can assist the boat 100 to plane more quickly. In some embodiments, the plane assist system 102 can be used to modify the wake produce by the boat 100 moving through water. The plane assist system 102 can also be used as a wake modifying system. For example, when the foil 116 is in the first deployed position (e.g., as shown in FIG. 2), the lift provided to the stern 108 of the boat 100 can reduce the size of the wake.

Figure 3:
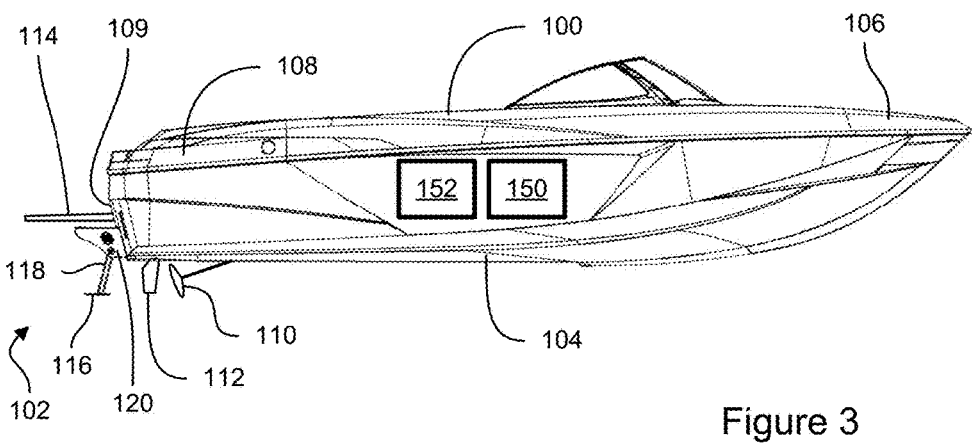
FIG. 3 shows an example embodiment of a boat having a plane assist system in a neutral configuration.

FIG. 3 shows the plane assist system 102 in a neutral configuration, in which the foil 116 can be positioned such that the foil 116 does not produce substantially lifting force or downward force on the boat 100 (e.g., on the stern 108). In some embodiments, the neutral position of the foil can be a deployed position, such that the foil 116 is positioned in the flow of water along the hull 104 (e.g., the flow of water along the bottom of the hull 104). The foil 116 in the neutral position can be positioned to be generally parallel to the flow of water (e.g., along the bottom of the hull 104) such that the foil 116 does not cause significant diverting of water as the water flows past the foil 116.

Figure 4:
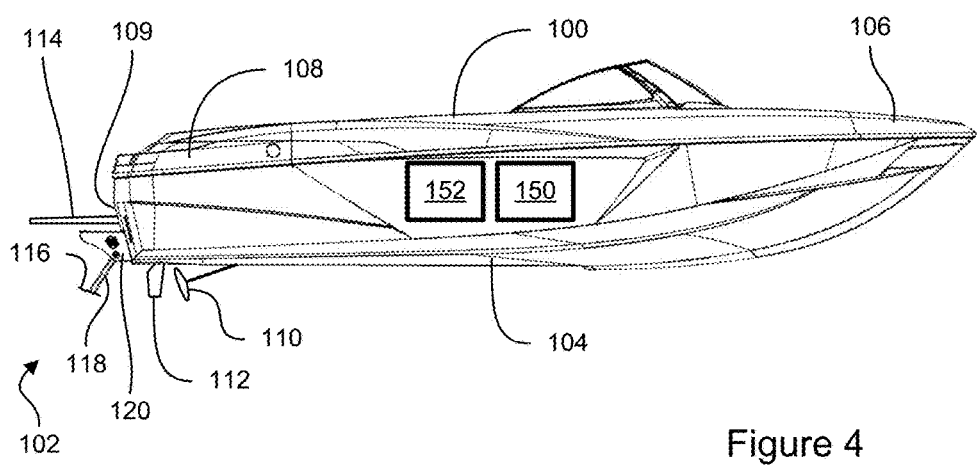
FIG. 4 shows an example embodiment of a boat having a plane assist system in a second deployed configuration that is configured to provide a downward force.

FIG. 4 shows the plane assist system 102 in a second deployed position, which can be configured to apply a downward force on the stern 108 of the boat 100. For example, the foil 116 in the second deployed position can divert water upward as the boat 100 moves forward through the water, which can apply a downward force on the foil 116 that pulls the stern 108 of the boat 100 downward when the boat 100 moves forward through the water. In the second deployed position, the foil 116 can extend into the flow of water along the hull 104 (e.g., along a bottom of the hull 104). Water flowing along the hull 104 can hit the foil 116 (e.g., as the water flows past the transom 109) and can be diverted upward by the foil 116. Pulling the stern 108 of the boat 100 downward into the water can increase the amount of water displaced by the boat 100, which can increase the size of the wake produced by the boat 100. In some embodiments, the foil 116 can be positioned at various interim positions (e.g., between the positioned discussed herein), which can provide flexible control over the amount of lift or downward pull applied to the boat 100 (e.g., to adjust the amount of planing assistance and/or the size and/or shape of the wake). In some embodiments, the neutral position (e.g., of FIG. 3) can be between the first deployed position (e.g., of FIG. 2) and the second deployed position (e.g., of FIG. 4).

Figure 6:
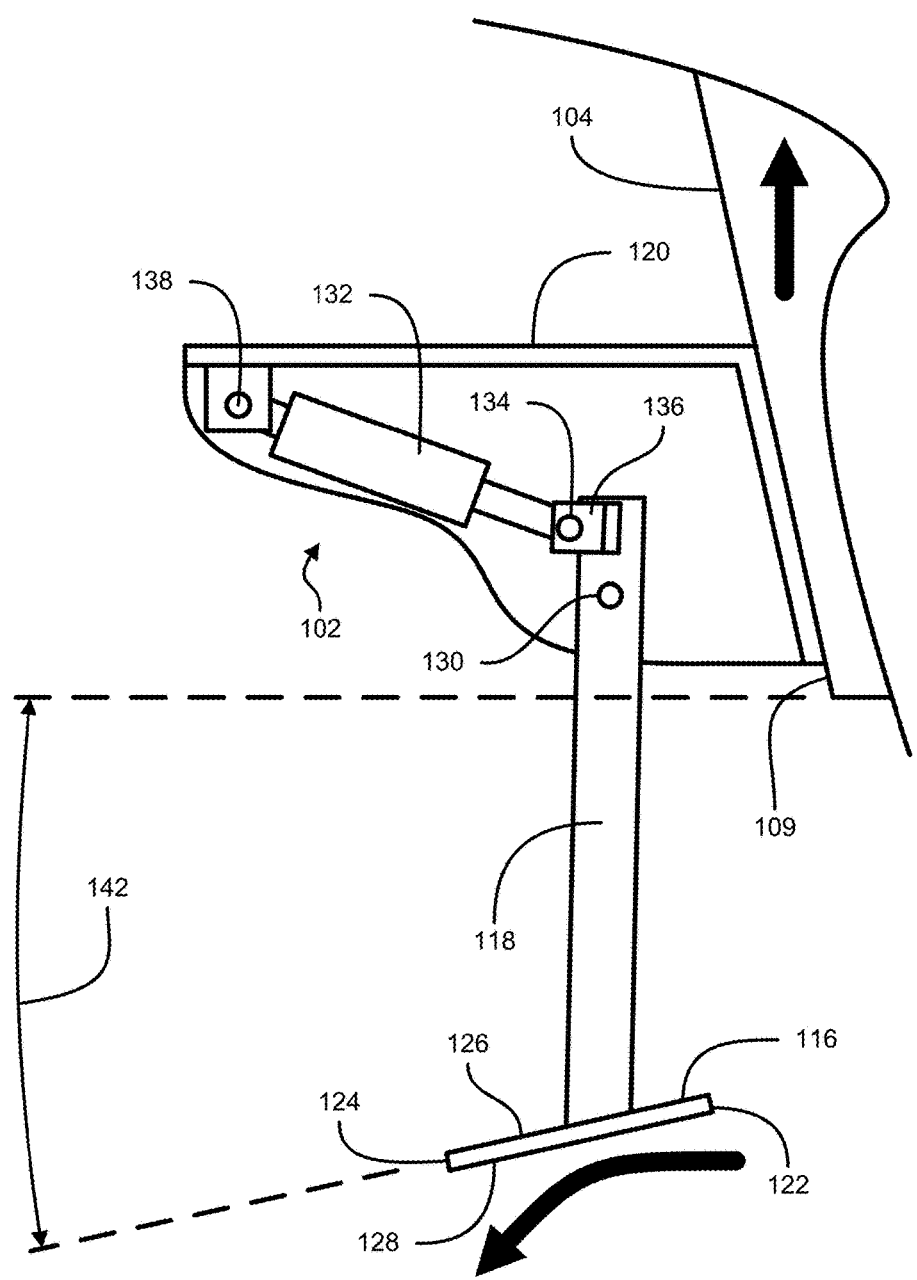
FIG. 6 shows an example embodiment of a plane assist system in a first deployed configuration that is configured to provide a lifting force.
Figure 7:
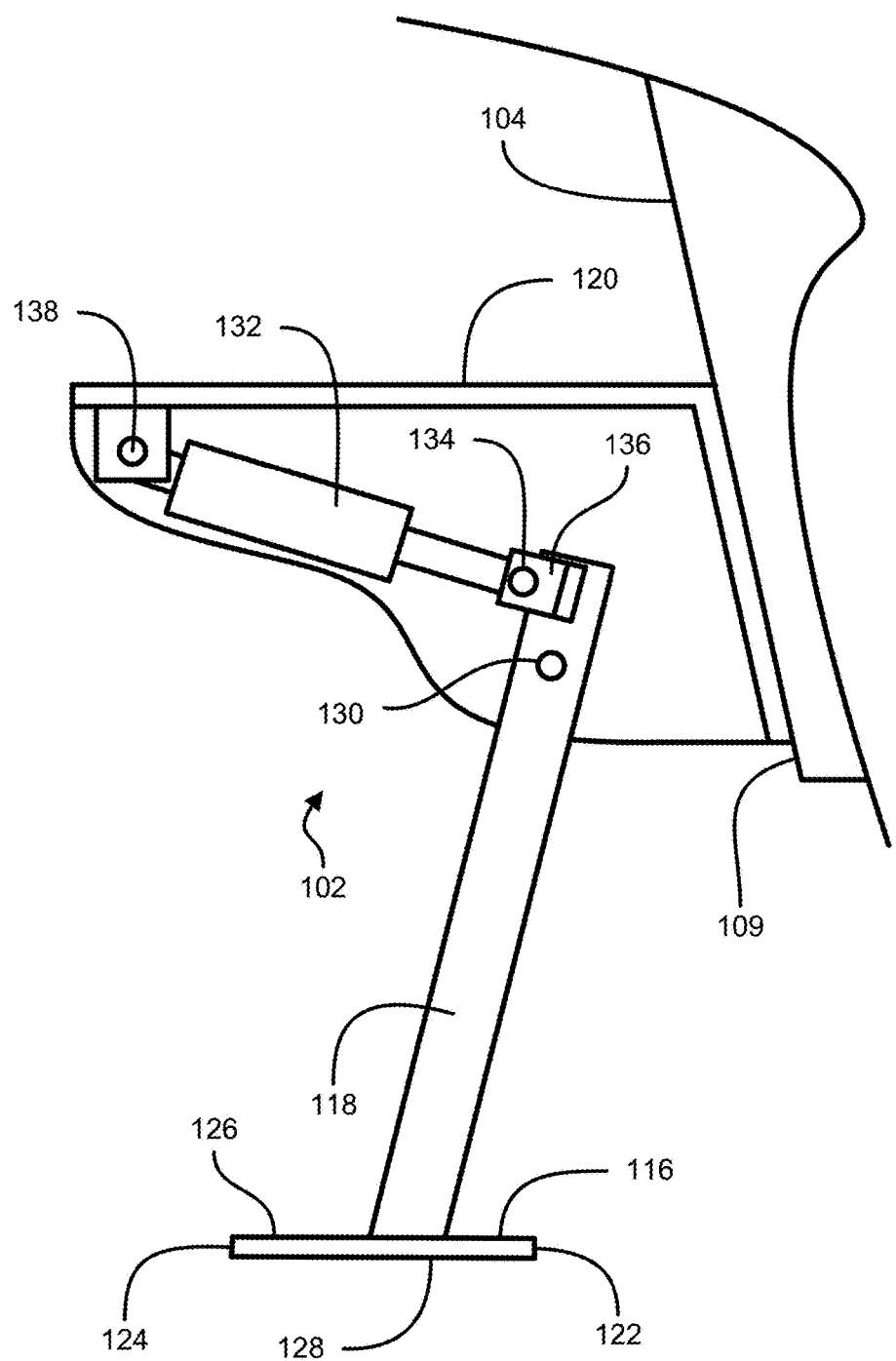
FIG. 7 shows an example embodiment of a boat having a plane assist system in a neutral configuration.
Figure 8:
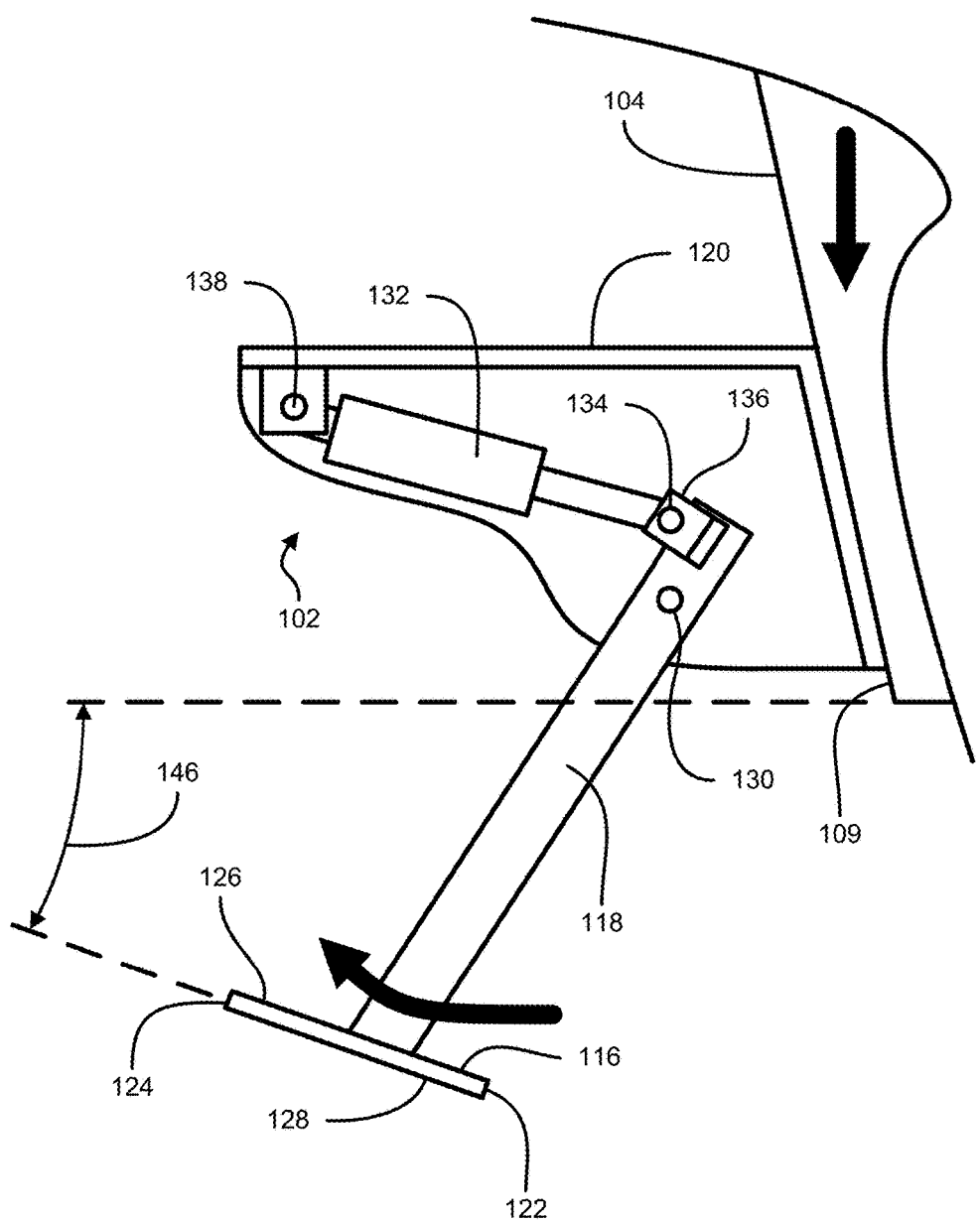
FIG. 8 shows an example embodiment of a plane assist system in a second deployed configuration that is configured to provide a downward force.

FIG. 5 shows the plane assist system 102 in the undeployed configuration. FIG. 6 shows the plane assist system 102 in the first deployed configuration (e.g., which can provide lift to the boat 100 as discussed herein). FIG. 7 shows the plane assist system 102 in the neutral position (e.g., which does not provide significant lift or downward force to the boat 100). FIG. 8 shows the plane assist system 102 in the second deployed configuration (e.g., which can provide downward pull to the boat 100 as discussed herein). The plane assist system 102 can include various features and details that are disclosed in U.S. Pat. No. 7,140,318 (the "'318 Patent"), issued Nov. 28, 2006, and titled METHOD AND APPARATUS FOR MODIFYING WAKE, the entirety of which is hereby incorporated by reference and made a part of this specification for all that it discloses.

The plane assist system 102 can be mounted at the stern 108 of the boat 100 (e.g., to the transom 109). In some embodiments, the plane assist system 102 (e.g., the foil 116) can be positioned at a generally central location (e.g., generally equidistant between the starboard and port sides of the boat 100). The longitudinal axis of the boat 100 can intersect the plane assist system 102 (e.g., the foil 116). In some implementations, when the foil 116 is in one of the deployed positions, the propeller 110 can direct water rearward against the foil 116, which can facilitate operation of the plane assist system 102.

The foil 116 can have a leading edge 122 and a trailing edge 124, which can be positioned rearward of the leading edge 122 when the foil 116 is deployed. The foil 116 can include a top surface 126 and a bottom surface 128, which can be positioned lower than the top surface 126 when the foil 116 is deployed. One or more arms 118 can be coupled to the top surface 126 of the foil 116. The one or more arms 118 can be coupled to the mounting member 120 (e.g., via at least one pivot coupling 130). The one or more arms 118 can pivot about the at least one pivot coupling 130 to move the foil 116 between positions. One or more actuators 132 can be configured to move the foil 116 between positions. For example, the one or more actuators 132 can be coupled to the one or more arms 118 and can be configured to cause the one or more arms 118 to pivot. The at least one pivot coupling 130 can be located between the location where the one or more arms couple to the foil 116 and the location where the one or more actuators 132 couple to the one or more arms 118. The one or more arms 118 can be coupled at first ends to the foil 116 and at second ends (opposite the first ends) to the one or more actuators 132. Various types of actuators can be used, including hydraulic cylinders, pneumatic cylinders, step motors, etc. The one or more arms 118 can be coupled to the one or more actuators 132 by at least one pivot coupling 134 (e.g., on a bracket 136). The one or more actuators 132 can be coupled to the mounting member 120 (e.g., via at least one pivot coupling 138). The mounting member 120 can cover the one or more actuators 132, the pivot couplings 130, 134, and/or 138, the arms 116, and/or various other components of the plane assist system 102.

FIG. 5 shows the plane assist system 102 in the undeployed configuration. To transition the foil 116 towards the undeployed position, the actuator 132 can move (e.g., push) the sides of the one or more arms 118 that are opposite the foil 116 towards the hull 104, which can cause the one or more arms 118 to pivot about the pivot coupling 130 to move the foil 116 away from the hull 104. By actuating the one or more actuators 132 (e.g., by extending the piston of a hydraulic or pneumatic cylinder), the foil 116 can be lifted to the undeployed position (e.g., as shown in FIG. 5).

FIG. 6 shows the plane assist system 102 in the first deployed configuration. To transition the foil 116 towards the first deployed position, the one or more actuators 132 can move (e.g., pull) the sides of the one or more arms 118 that are opposite the foil 116 away from the hull 104, which can cause the one or more arms to pivot about the pivot coupling 130 to move the foil 116 towards the hull 104. By actuating the one or more actuators (e.g., by retracting the piston of a hydraulic or pneumatic cylinder), the foil 116 can be moved (e.g., lowered) to the first deployed position. In the first deployed position, the bottom surface 128 of the foil 116 can face generally forward such when the boat 100 travels forward water strikes the bottom surface 128 of the foil 116 and is redirected generally downward, which can provide a lifting force on the foil 116. The foil 116 in the first deployed position can be offset from the flow of water by an angle 142. In some embodiments, the bottom of the hull 104 (e.g., at the transom 109) can direct the flow of water towards the foil 116. As shown in FIG. 6, the foil 116 in the first deployed position can be oriented so that it is offset from the bottom of the hull 104 (e.g., at the transom 109) by an angle 142. The angle 142 can be at least about 5 degrees, at least about 10 degrees, at least about 15 degrees, at least about 20 degrees, at least about 25 degrees, at least about 30 degrees, or more. The angle 142 can be less than or equal to about 40 degrees, less than or equal to about 30 degrees, less than or equal to about 20 degrees, less than or equal to about 10 degrees, or less. In some embodiments, the angle 142 can be between about 5 degrees and about 20 degrees, or between about 10 degrees and about 15 degrees, or the angle can be about 13 degrees. Different positions of the foil 116 can provide different amounts of lifting force.

FIG. 7 shows the plane assist system 102 in a neutral position. To transition the foil 116 from the first deployed position (e.g., FIG. 6) to the neutral position, the one or more actuators can move (e.g., push) the side of the one or more arms 118 that are opposite the foil 116 towards the hull 104, which can cause the one or more arms 118 to pivot about the pivot coupling 130 to move the foil 116 away from the hull 104. To transition the foil 116 from the undeployed or stowed position (e.g., FIG. 5) to the neutral position, the one or more actuators can move (e.g., pull) the side of the one or more arms 118 that are opposite the foil 116 away from the hull 104, which can cause the one or more arms 118 to pivot about the pivot coupling 130 to move the foil 116 towards the hull 104. In the neutral position, the foil 116 can be position in the flow of water (e.g., flowing along the bottom of the hull 104 and past the transom 109), and the foil 116 can be oriented such that the water flowing past the foil 116 is not significantly diverted by the foil 116. In the neutral position, the foil 116 can be in the flow of water without producing substantially lifting force and without producing substantial downward force. The foil 116 can be oriented substantially parallel to the flow of water and/or substantially parallel to the bottom of the hull 104 (e.g., at the transom 109). In the neutral position, the foil 116 can be offset from the flow of water and/or from the bottom of the hull 104 (e.g., at the transom) by less than about 10 degrees, less than about 5 degrees, less than about 3 degrees, less than about 1 degree, or less. In some embodiments, in the neutral position, the foil 116 can be offset from the flow of water and/or from the bottom of the hull 104 (e.g., at the transom) by at least about 1 degree, at least about 2 degrees, at least about 5 degrees, or more.

FIG. 8 shows the plane assist system 102 in the second deployed configuration. To transition the foil 116 to the second deployed position, the one or more actuators 132 can move (e.g., push or pull) the sides of the one or more arms 118 that are opposite the foil 116 away from or towards the hull 104, which can cause the one or more arms to pivot about the pivot coupling 130 to move the foil 116 towards or away from the hull 104. In the second deployed position, the top surface 126 of the foil 116 can face generally forward such that, when the boat 100 travels forward, water strikes the top surface 126 of the foil 116 and is redirected generally upward, which can provide a downward force on the foil 116 and on the boat 100. The foil 116 in the second deployed position can be offset from the flow of water by an angle 146. The foil 116 in the second deployed position can be offset from the bottom of the hull 104 (e.g., at the transom 109) by the angle 146. The angle 146 can be at least about 5 degrees, at least about 10 degrees, at least about 15 degrees, at least about 20 degrees, at least about 25 degrees, at least about 30 degrees, at least about 35 degrees, at least about 40 degrees, or more. The angle 146 can be less than or equal to about 50 degrees, less than or equal to about 40 degrees, less than or equal to about 30 degrees, less than or equal to about 20 degrees, less than or equal to about 10 degrees, or less. The angle 146 can be between about 10 degrees and about 30 degrees, or between about 15 degrees and about 25 degrees, or the angle 146 can be about 19 degrees. Different positions of the foil 116 can provide different amounts of downward force. In the first deployed position (e.g., see FIG. 6), the foil 116 can be angled with respect to the flow of water and/or the bottom of the hull 104 (e.g., at the transom 109) in a first direction (e.g., configured to divert water downward), and in the second deployed position (e.g., see FIG. 8), the foil 116 can be angled with respect to the flow of water and/or the bottom of the hull 104 (e.g., at the transom) in a second direction (e.g., configured to divert water upward). The second direction can be opposite the first direction.

In some embodiments, the arms 118 can have a length such that at least part of the foil 116 is positioned lower than the rudder 112 when in the first deployed position and/or when in the second deployed position. In some embodiments, at least a portion of the foil 116 can be positioned directly below at least a portion of the rudder 112 when the foil 116 is in the first deployed position. In some embodiments, at least a portion of the foil 116 in the first deployed position and/or in the second deployed position can be positioned lower than the propeller 110. In some embodiments, at least a portion of the foil 116 can be positioned forward of a rearward edge of the hull 104 (e.g., forward of the lower edge of the transom 109) when the foil 116 is in the first deployed position.

Figure 9:
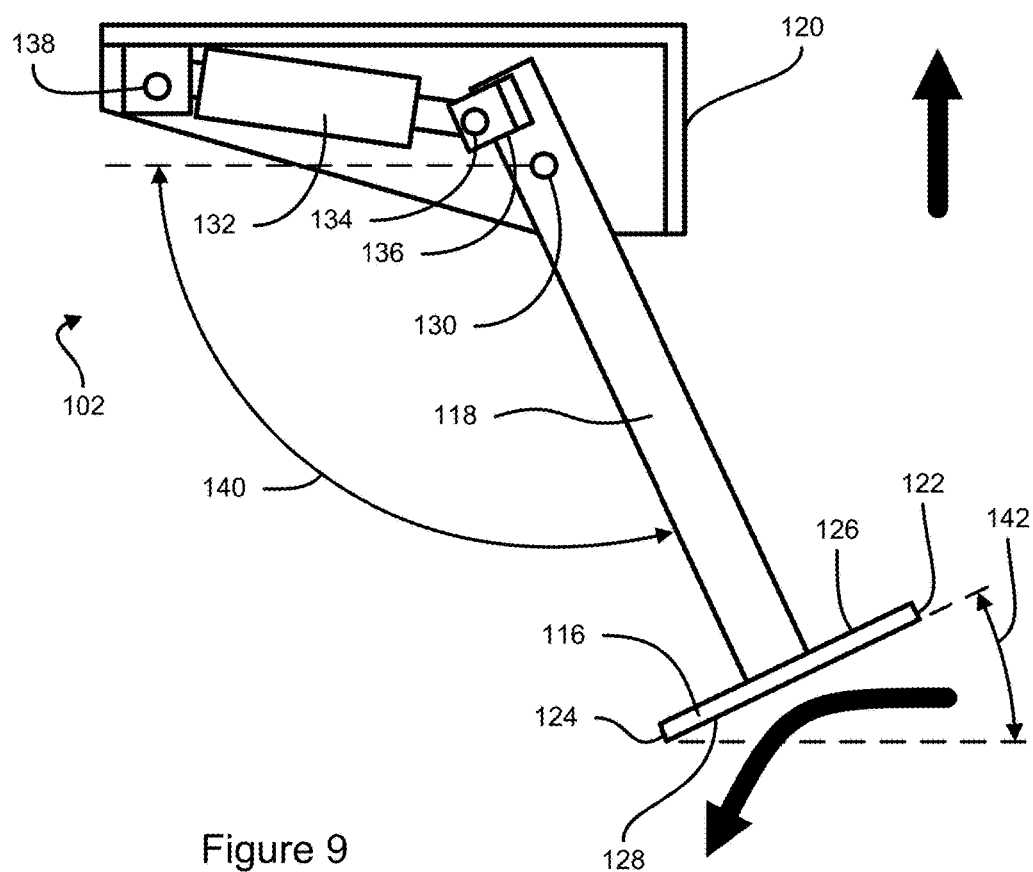
FIG. 9 shows another example embodiment of a plane assist system in a first deployed configuration that is configured to provide a lifting force.
Figure 10:
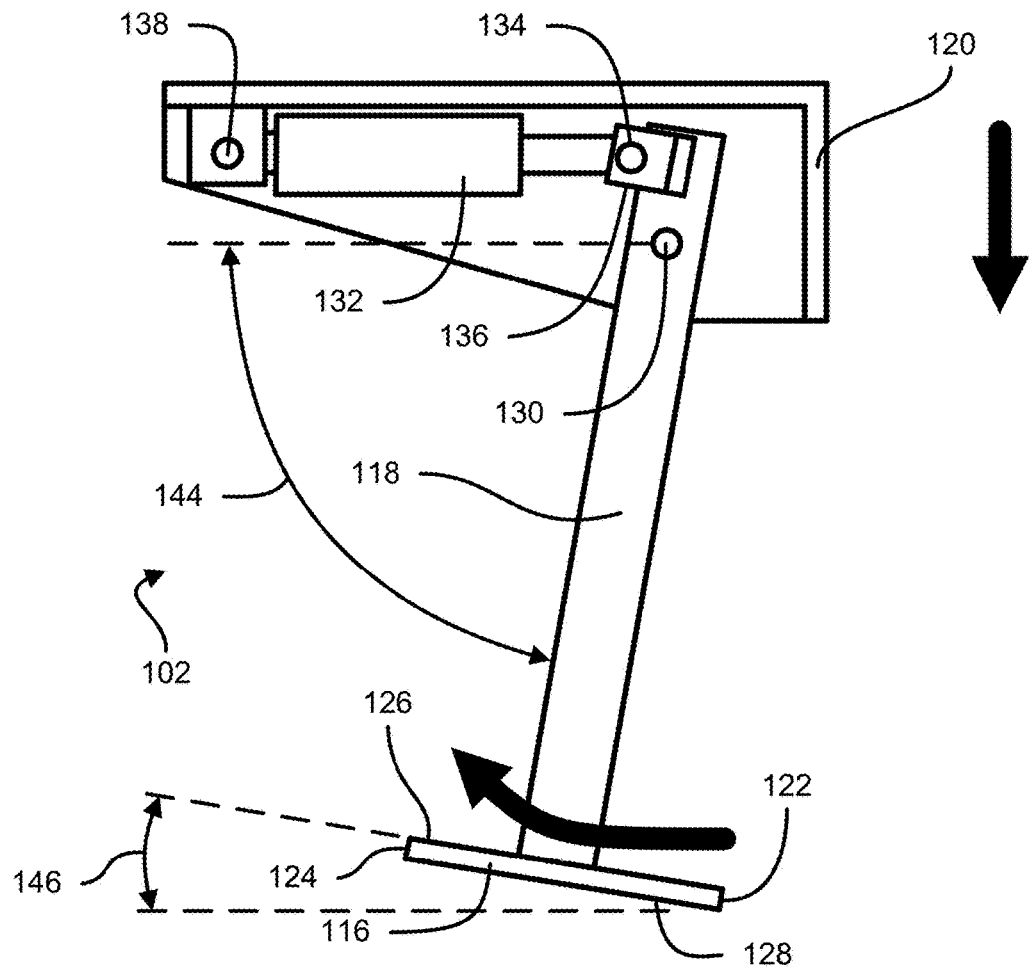
FIG. 10 shows another example embodiment of a plane assist system in a second deployed configuration that is configured to provide a downward force.

The foil 116 can be coupled to the arms 118 at various different angles. For example, in FIGS. 6 to 8, the foil 116 is coupled to the one or more arms 118 at an angle such that the bottom surface of 128 of the foil 116 is angled generally forward when the one or more arms 118 are disposed substantially vertically (e.g., see FIG. 6). In some embodiments, the angle between the foil 116 and the one or more arms 118 can be offset from perpendicular by the angle 142, which can have the ranges and values disclosed herein. The foil 116 can divert water generally downward to produce a lifting force while the one or more arms 118 are substantially vertical or angled rearward. Many variations are possible. For example, FIGS. 9 and 10 illustrate an embodiment in which the foil 116 can be coupled to the one or more arms 118 such that the one or more arms 118 are substantially perpendicular to the foil 116. FIG. 9 shows the foil 116 at a first deployed position that is configured to provide a lifting force to the boat 100. FIG. 10 shows the foil 116 in a second deployed position that is configured to provide a downward force to the boat 100. Thus, depending on the configuration of the system 102, the foil 116 can produce various different forces when the arms are positions at various different locations. For example, when the one or more arms 118 are disposed substantially vertically, the foil 116 can be angled to divert water downward (e.g., see FIG. 6), or the foil 116 can be angled to divert water upward (e.g., if the foil 116 were angled with respect to the one or more arms 118 opposite to the direction shown in FIG. 6), or the foil 116 can be oriented to not divert substantial water (e.g., if the foil 116 shown in FIG. 9 were rotated back until the one or more arms 118 were substantially vertical).

In some embodiments, the foil 116 and/or the one or more arms 118 can pivot across an angle 140 between the undeployed position (e.g., see FIGS. 1 and 5) and the first deployed position (e.g., see FIGS. 2, 6, and 9). In FIG. 9 the undeployed orientation of the one or more arms 118 is shown by a dashed line. In some embodiments, the angle 140 can be at least about 75 degrees, at least about 80 degrees, at least about 85 degrees, at least about 90 degrees, at least about 95 degrees, at least about 100 degree, at least about 110 degrees, at least about 120 degrees, at least about 130 degrees, or more. The angle 140 can be less than or equal to about 150 degrees, less than or equal to about 130 degrees, less than or equal to about 110 degrees, less than or equal to about 100 degrees, less than or equal to about 90 degrees, less than or equal to about 80 degrees, or less. In some embodiments, when in the first deployed position, the one or more arms 118 can be angled forward (e.g., see FIG. 9). In some embodiments, when in the first deployed position, the one or more arms 118 can be substantially vertical (e.g., slightly angled back away from the hull 104 as shown in FIG. 6). In some embodiments, the one or more arms 118 and/or the foil 116 can pivot by more than 90 degrees between the undeployed or stowed position and the first deployed position, which can be configured to provide a lifting force (e.g., compare FIGS. 1 and 2, compare FIGS. 5 and 6, and see FIG. 9).

In some embodiments, the second deployed position of the foil 116 and/or the one or more arms 118 can be offset from the undeployed position by an angle 144. In FIG. 10, the undeployed or stowed position for the one or more arms 118 is shown as a dashed line. The difference between the undeployed and second deployed positions can also be seen by comparing FIGS. 1 and 4 and by comparing FIGS. 5 and 8. The angle 144 can be at least about 45 degrees, by at least about 60 degrees, by at least about 70 degrees, by at least about 80 degrees, by at least about 85 degrees, at least about 90 degrees, at least about 95 degrees, at least about 100 degrees, or more. The angle 144 can be less than or equal to about 110 degrees, less than or equal to about 100 degrees, less than or equal to about 90 degrees, less than or equal to about 80 degrees, less than or equal to about 70 degrees, less than or equal to about 60 degrees, or less. In some cases, the angle 144 can be less than 90 degrees. In some embodiments, when in the second deployed position, the one or more arms 118 can be angled rearward, although many other configurations are possible.

Figure 11:
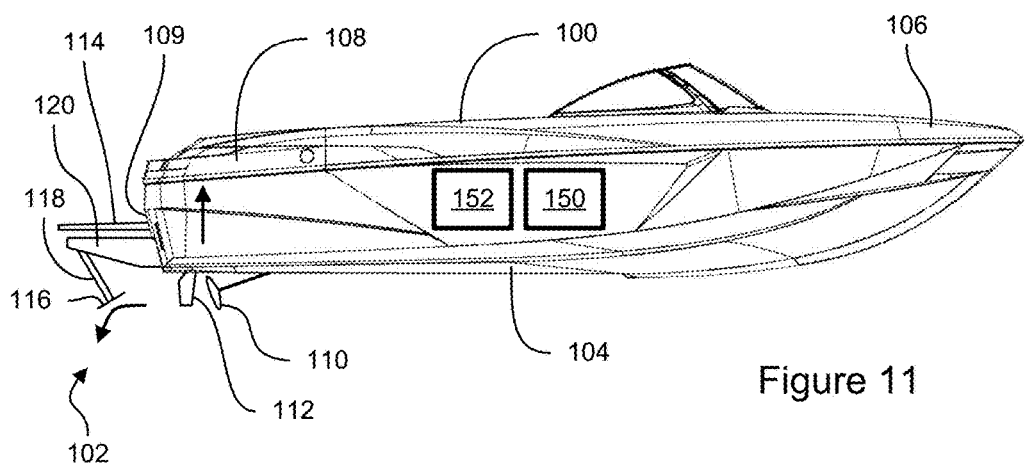
FIG. 11 shows another example embodiment of a plane assist system in a first deployed configuration that is configured to provide a lifting force.
Figure 12:
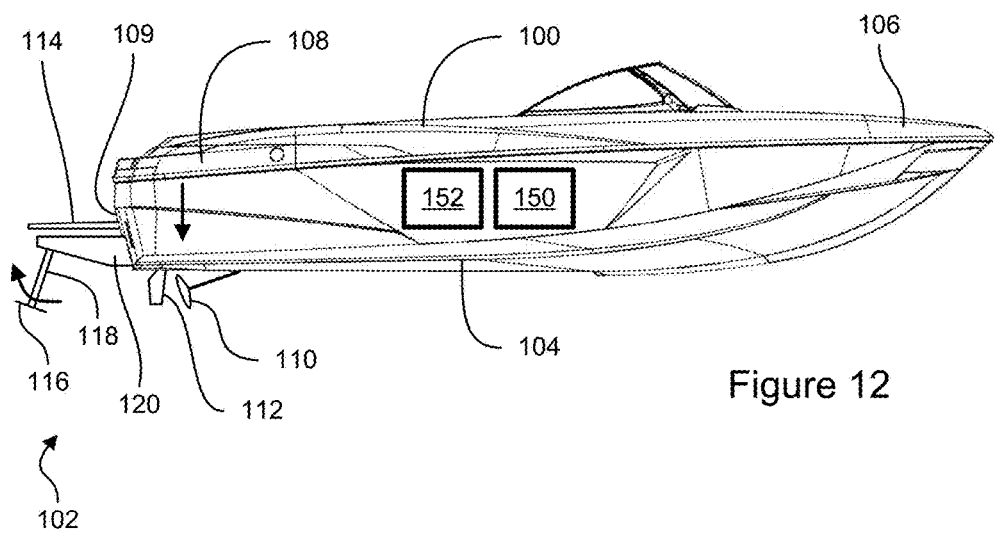
FIG. 12 shows another example embodiment of a plane assist system in a second deployed configuration that is configured to provide a downward force.

With reference to FIGS. 11 and 12, in some embodiments, the plane assist system 102 can be configured to pivot the foil 116 forward and upward towards the undeployed position. The foil 116 can pivot across an angle of less than 90 degrees from the undeployed position to the first deployed position (e.g., shown in FIG. 11). The foil 116 can pivot past the first deployed position (e.g., past 90 degrees from the undeployed position) to the second deployed position (e.g., shown in FIG. 12).

Figure 13:
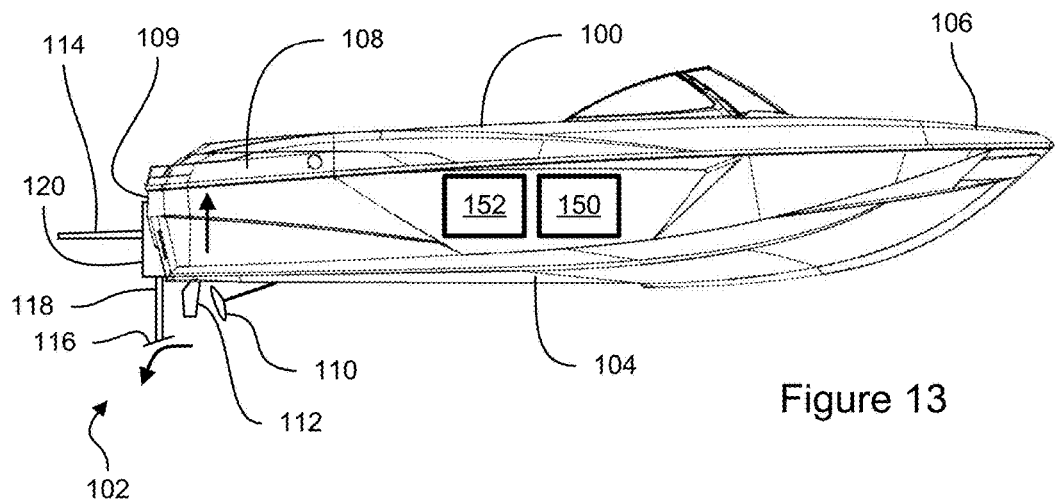
FIG. 13 shows another example embodiment of a plane assist system in a first deployed configuration that is configured to provide a lifting force.
Figure 14:
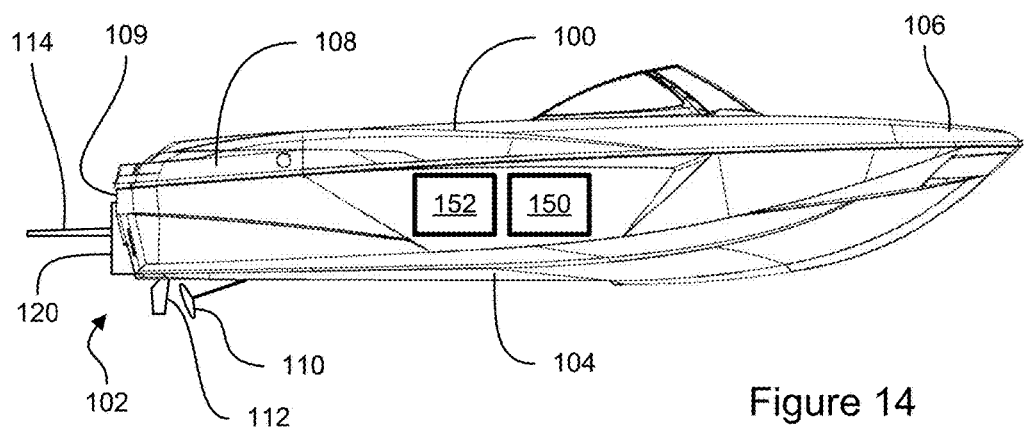
FIG. 14 shows another example embodiment of a plane assist system in an undeployed configuration.

With reference to FIGS. 13 and 14, in some embodiments, the plane assist system 102 can be configured to move the foil 116 linearly between the undeployed (e.g., lifted) position and the first deployed (e.g., lowered) position, which can produce a lifting force, as discussed herein. FIG. 13 shows the foil 116 positioned in the first deployed position, which can be configured to provide a lifting force to the boat 100. FIG. 14 shows the foil 116 in an undeployed position. For example, the foil 116 can be retracted to a location behind the transom 109 and/or recessed into the mounting member 120 when in the undeployed or stowed position.

The boat 100 can include a user interface 150, which can be configured to enable a user (e.g., the driver or a non-driver passenger in the boat 100) to operate the plane assist system 102. The plane assist system 102 can be responsive to user input received by the user interface 150. The boat can include a controller 152, which can include one or more processing devices (e.g., computer processors or integrated circuits), that can be configured to control the plane assist system 102 (e.g., by activating the one or more actuators 132) in response to user input received by the user interface 150.

The user interface 150 can include one or more user input elements (e.g., one or more touchscreens, buttons, knobs, switches, virtual buttons, etc.). The one or more user input elements can enable a user to activate or deactivate the plane assist system 102. The one or more user input elements can be configured to receive input from a user specifying an amount of lift assist. For example, a user can specify a small, medium, or large amount of lift assist, and the foil 116 can be actuated to a position that is configured to provide the corresponding amount of lifting force. In some embodiments, the user interface 150 can include one or more user output elements (e.g., at least one display such as a touchscreen, one or more lights, audio speakers, etc.). The one or more user output elements can be configured to communicate information the user (e.g., in response to signals received from the controller 152). For example, the one or more user output elements can be configured to notify a user that the plane assist system 102 is in the first deployed configuration (e.g., which can provide a lifting force to the stern 108 of the boat 100 when the boat 100 moves forward through water).

In some embodiments, the foil 116 can be used to modify the shape and/or size of the wake after the boat 100 is planing. The user interface 150 can be configured to receive user input regarding a desired shape or size of the wake. For example, the user interface 150 can be configured to enable a user to select a wake height, a wake length, a wake shape, etc. The foil 116 can be positioned in response to the user input. In some embodiments, the user interface 150 can be configured to enable a user to specify an activity type (e.g., water skiing, beginner wakeboarding, advanced wakeboarding, wake surfing, skim wake surfing, etc.) and the foil 116 be positioned to produce a wake appropriate for the specified activity after the boat is planing.

By way of example, while the boat 100 is not planing (e.g., is substantially stopped) a user can provide user input to the user interface 150 to activate the plane assist system 102 (and in some cases the user can specify an amount of desired plane assistance), and the user can provide user input relating to desired wake attributes or a specified activity. The foil 116 can be moved to the first deployed position (or another position configured to apply the specify amount of lifting force), and the user interface can notify the user (e.g., via a display or light or sound) that the plane assist system 102 is ready. The user can then actuate a throttle to move the boat 100 forward. As the boat 100 moves forward, the foil 116 can provide a lifting force as discussed herein to help the boat plane. Once the boat is planing, the foil can move to the second deployed position (or another position configured to modify the wake to have the specified attributes. In some embodiments, the boat 100 can include a sensor (not shown) that is configured to facilitate determining whether the boat 100 is planing. For example, the speed of the boat 100 can be used to determine whether the boat 100 is planing (e.g., traveling faster than a predetermined speed such as faster than the hull speed of the boat 100 (e.g., 7 mph)). The sensor can include an accelerometer configured to determine the orientation of the boat 100 (e.g., to determine whether the bow is lifted or if the boat 100 is level enough to be planing). In some embodiments, the controller 152 can be configured to determine whether the boat 100 is planing based on multiple factors (e.g., the speed of the boat 100 and the orientation of the boat 100).

Many variations are possible. For example, in some embodiments, after the boat 100 is planing, the plane assist system 102 can transition to the undeployed position (e.g., in which the foil 116 is configured to not provide substantial lifting force or downward force). In some embodiments, the foil 116 can move as the orientation of the boat 100 changes (e.g., to maintain the lifting force, or to change the lifting force as the boat 100 approaches planing speed).

Figure 15:
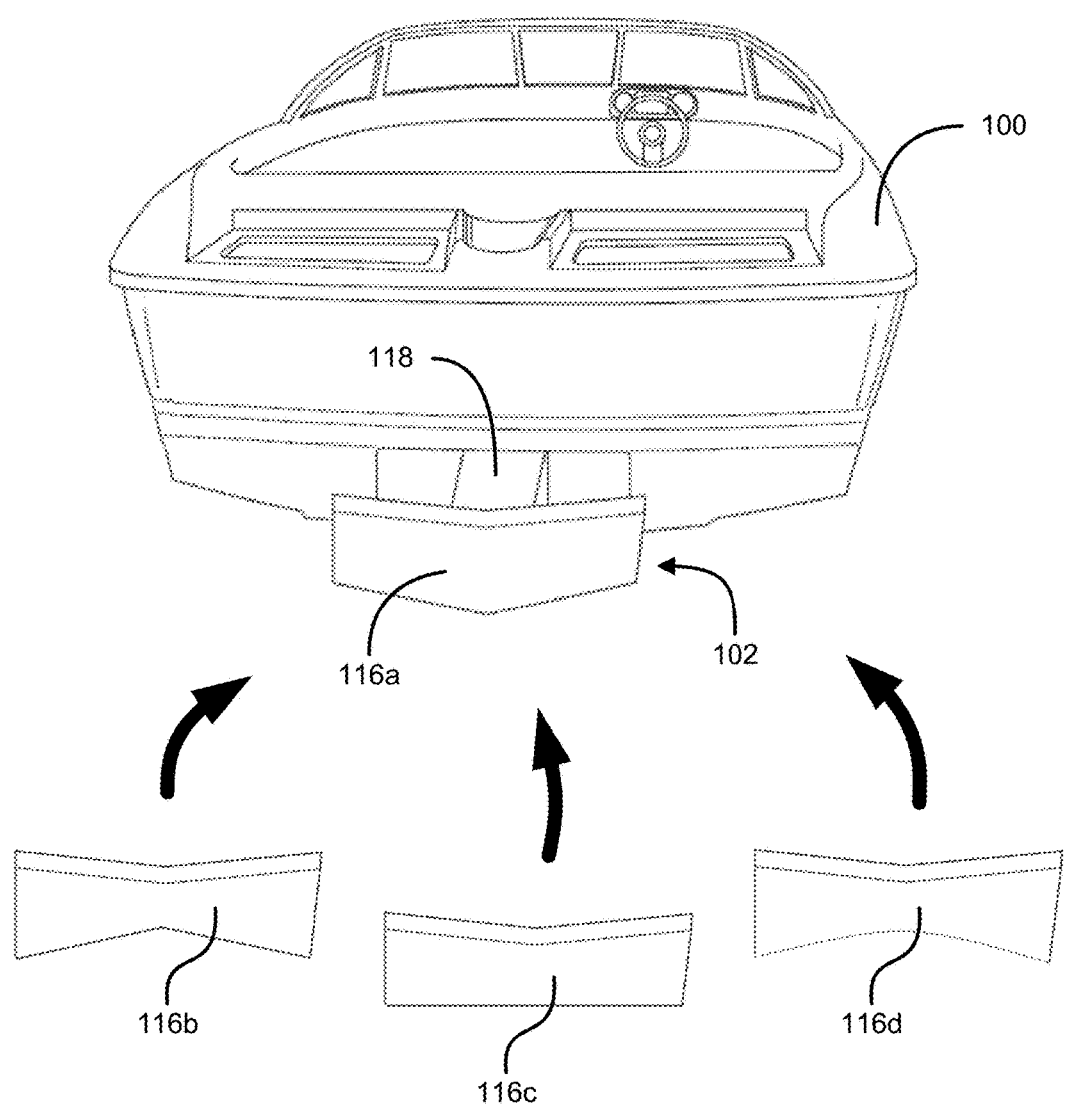
FIG. 15 shows an example embodiment of a plane assist system with interchangeable foils.

With reference to FIG. 15, in some embodiments, the system 102 can have interchangeable foils 116*a*-*d*. The different foils 116*a*-*d* can have different shapes, different orientations, and/or different sizes, which can be configured to produce effects (e.g., different amounts of lifting force or downward force and/or different wake shaping effects). The foils 116*a*-*d* can be removably coupled to a positioning element 118 (e.g., one or more arms). The positioning element 118 can be configured to removably receive the foils 116*a*-*d*, and the foils 116*a*-*d* can be configured to removably attach to the positioning element 118. The foils 116*a*-*d* and/or the positioning element 118 can include coupling mechanisms (not shown in FIG. 15) configured to removably attach the foils 116*a*-*d* to the positioning element 118. For example, a sliding engagement members, snap fit engagement members, friction fit engagement members, claps, pins, or any other suitable engagement members can be used to removably couple the foils 116*a*-*d* to the positioning element 118.

In some embodiments, the user interface 150 can be configured to receive input from a user to identify which of the foils 116*a*-*d* is attached to the positioning element 118. A memory can store information regarding which of the foils 116*a*-*d* is attached. The one or more actuators can position the foil 116*a*-*d* at least in part depending on which foil 116*a*-*d* is attached. In some embodiments, a sensor (now shown) can detect which foil 116*a*-*d* is attached to the positioning element 118.

Some aspects of the systems and methods described herein can be implemented using, for example, computer software, hardware, firmware, or any combination of computer software, hardware, and firmware. Computer software can include computer executable code stored in computer readable medium (e.g., non-transitory computer readable medium) that, when executed, causes one or more computing devices to perform the functions described herein. In some embodiments, computer-executable code is executed by one or more general purpose computer processors. It will be appreciated, in light of this disclosure, that any feature or function that can be implemented using software to be executed on one or more general purpose computer processors can also be implemented using a different combination of hardware, software, and/or firmware. For example, such a feature or function can be implemented completely in hardware using one or more integrated circuits. Alternatively or additionally, such a feature or function can be implemented completely or partially using one or more specialized computers.

Any features of the embodiments shown and/or described in the figures that have not been expressly described in this text, such as distances, proportions of components, etc. are also intended to form part of this disclosure. However, in some instances, various features may not be shown to scale. Additionally, although these inventions have been disclosed in the context of various embodiments, features, aspects, and examples, it will be understood by those skilled in the art that the present inventions extend beyond the specifically disclosed embodiments to other alternative embodiments and/or uses of the inventions and obvious modifications and equivalents thereof. Accordingly, it should be understood that various features and aspects of the disclosed embodiments can be combined with, or substituted for, one another in order to perform varying modes of the disclosed inventions. The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure.

Various methods are described herein. It will be understood that in many cases, certain steps may be combined together such that multiple steps discussed herein can be performed as a single step. Also, certain steps can be broken in to additional sub-steps to be performed separately. In many instances, the order of the steps can be rearranged and certain steps may be omitted entirely. Also, the methods described herein are to be understood to be open-ended, such that additional steps to those shown and described herein can also be performed. Thus, it is intended that the scope of the present inventions disclosed herein should not be limited by the particular disclosed embodiments described herein.

What is claimed is:

1. An inboard water-sport boat comprising:
   a hull having a transom; and
   a foil coupled to the hull and movable between an undeployed position, a first deployed position, and a second deployed position, wherein the foil is configured to produce a lifting force when in the first deployed position as the hull moves through water, wherein the foil is configured to produce a downward force when in the second deployed position as the hull moves through water, wherein at least a portion of the foil is disposed above a bottom edge of the transom when in the undeployed position, and wherein the foil rotates across an angle greater than 90 degrees between the undeployed position and the first deployed position.

2. The inboard water-sport boat of claim 1, wherein the foil is oriented substantially vertically when in the undeployed position.

3. The inboard water-sport boat of claim 1, further comprising one or more actuators configured to move the foil between the undeployed position, the first deployed position, and the second deployed position.

4. The inboard water-sport boat of claim 3, further comprising a user interface configured to receive user input, and wherein the one or more actuators are configured to move the foil in response to the user input received by the user interface.

5. The inboard water-sport boat of claim 3, configured such that the one or more actuators automatically move the foil from the first deployed position to the undeployed position or the second deployed position when the boat is planing.

6. The inboard water-sport boat of claim 3, configured such that the one or more actuators automatically move the foil from the first deployed position to the second deployed position when the boat is planing.

7. The inboard water-sport boat of claim 3, configured such that the one or more actuators automatically move the foil from the first deployed position to the undeployed position or the second deployed position when the boat is moving above a pre-determined speed.

8. The inboard water-sport boat of claim 3, configured such that the one or more actuators automatically move the foil from the first deployed position to the second deployed position when the boat is moving above a pre-determined speed.

9. The inboard water-sport boat of claim 3, further comprising a user interface configured to output a notification to a user when the foil is in the first deployed position.

10. The inboard water-sport boat of claim 1, further comprising one or more arms coupled to the foil, wherein the one or more arms are movable for positioning the foil at the undeployed position, the first deployed position, and the second deployed position, and wherein the foil is coupled to the one or more arms at an angle that offset from perpendicular by between about 5 degrees and about 40 degrees.

11. The inboard water-sport boat of claim 10, wherein the foil is coupled to the one or more arms at an angle that offset from perpendicular by between about 10 degrees and about 30 degrees.

12. A system for facilitating planing of a watercraft traveling through water, the system comprising:
    a foil movable between an undeployed position and a first deployed position, wherein the foil is positioned substantially vertically when in the undeployed position, wherein the first deployed position of the foil is configured to divert water generally downward as the watercraft travels forward through water to produce a lifting force, and wherein the foil rotates across an angle greater than 90 degrees between the undeployed position and the first deployed position;
    a user interface configured to receive user input; and
    one or more actuators configured to move the foil in response to input received by the user interface.

13. The system of claim 12, further comprising one or more arms having first ends and second ends, wherein the first ends of the one or more arms are coupled to the foil and wherein the second ends are coupled to the one or more actuators, and wherein the one or more arms are configured to pivot about a pivot coupling that is between the first and second ends of the one or more arms.

14. The system of claim 12, further comprising one or more arms coupled to the foil, wherein the one or more arms are movable for positioning the foil at the undeployed position and the first deployed position, and wherein the foil is coupled to the one or more arms at an angle that offset from perpendicular by between about 10 degrees and about 30 degrees.

15. The system of claim 12, further comprising a mounting member configured to couple the foil to the transom of the watercraft.

16. The system of claim 12, further comprising a controller configured to operate the one or more actuators in response to input received by the user interface.

17. The system of claim 12, wherein at least a portion of the foil is configured to be positioned out of the water when in the undeployed position.

18. The system of claim 12, where substantially the entire foil is configured to be positioned out of the water when in the undeployed position.

19. The system of claim 12, wherein the foil is movable to a second deployed position that is configured to divert water generally upward as the watercraft travels forward through water to produce a downward force.

20. The system of claim 19, wherein the system is configured to move the foil to the second deployed position after the watercraft is planing.

21. The system of claim 19, wherein the system is configured to move the foil to the second deployed position when the watercraft is moving faster than a predetermined speed.

22. The system of claim 12, wherein the system is configured to move the foil to the undeployed position after the watercraft is planing.

23. The system of claim 12, wherein the system is configured to move the foil to the undeployed position when the watercraft is moving faster than a predetermined speed.

24. The system of claim 12 in combination with a watercraft, wherein the foil is positioned at the stern of the watercraft at a central location that is about equidistant between the sides of the watercraft.

25. The system of claim 12 in combination with a watercraft having a transom, wherein at least a portion of the foil is disposed above a bottom edge of the transom when in the undeployed position.

26. A water-sport boat comprising:
- a hull configured to produce a wake as the hull moves through water;
- a ballast system configured to add water to one or more ballast containers on the boat to affect a size of the wake;
- a user interface configured to receive user input regarding one or more target wake parameters; and
- a plane assist system comprising:
  - a foil coupled to the hull and movable between an undeployed position, a first deployed position, and a second deployed position, wherein the foil is configured to produce a lifting force when in the first deployed position as the hull moves through water, and wherein the foil is configured to produce a downward force when in the second deployed position as the hull moves through water; and
  - at least one actuator configured to move the foil; and
  - a sensor configured to provide a signal indicative of whether the boat is planing;
- wherein the at least one actuator positions the foil of the plane assist system in the first deployed position when the signal of the sensor indicates that the boat is not planing, wherein the first deployed position of the foil produces a lifting force on the hull as the hull moves through water to facilitate planing of the hull;
- wherein the at least one actuator automatically transitions the foil of the plane assist system from the first deployed position to a different position after the signal of the sensor indicates that the boat is planing, wherein the different position of the water diverter is configured to facilitate production of a wake having the one or more target wake parameters.

27. The water-sport boat of claim 26, wherein the one or more target wake parameters comprise one or more of a wake size, a wake shape, and a water-sport activity wake type.

28. The water-sport boat of claim 26, wherein the user interface is configured to receive user input specifying an amount of plane assist, and wherein the first position of the at least one water diverter for producing the lifting force to facilitate planing of the hull is based at least in part on the specified amount of plane assist.

29. The water-sport boat of claim 26, wherein the user interface is configured to output a notification to a user when the water diverter is in the first position.

30. The water-sport boat of claim 26, wherein the sensor comprises an accelerometer configured to determine the orientation of the boat.

31. The water-sport boat of claim 26, wherein the sensor determines a speed of the boat.

32. The water-sport boat of claim 26, wherein the different position of the at least one water diverter is the second deployed position that is configured to produce the downward force on the hull as the hull moves through water.

* * * * *